(12) United States Patent
Takuhara et al.

(10) Patent No.: US 6,706,104 B2
(45) Date of Patent: Mar. 16, 2004

(54) INK SET, INK JET RECORDING METHOD, RECORDING UNIT, INK CARTRIDGE, INK JET RECORDING APPARATUS, BLEED-ALLEVIATING METHOD, AND METHOD FOR IMPROVING FIXABILITY OF BLACK IMAGE

(75) Inventors: Hiroyuki Takuhara, Tokyo (JP); Yoshihisa Takizawa, Tokyo (JP); Kumiko Mafune, Kanagawa (JP); Hisashi Teraoka, Shizuoka (JP); Yoichi Takada, Kanagawa (JP); Noriyasu Asaki, Kanagawa (JP); Yuko Takada, Kanagawa (JP); Tsuyoshi Kanke, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 09/942,579

(22) Filed: Aug. 31, 2001

(65) Prior Publication Data

US 2002/0093557 A1 Jul. 18, 2002

(30) Foreign Application Priority Data

Sep. 4, 2000 (JP) ........................................ 2000-267800
Feb. 7, 2001 (JP) ........................................ 2001-031439

(51) Int. Cl.[7] ................................................ C09D 11/02
(52) U.S. Cl. ................ 106/31.6; 106/31.27; 106/31.28; 106/31.47; 106/31.48; 106/31.51; 106/31.52
(58) Field of Search ............................... 406/31.6, 31.27, 406/31.28, 31.47, 31.51, 31.48, 31.52; 347/100

(56) References Cited

U.S. PATENT DOCUMENTS

| 4,202,870 A | 5/1980 | Weber et al. ................ 423/630 |
| 4,242,271 A | 12/1980 | Weber et al. ................ 260/448 |
| 4,313,124 A | 1/1982 | Hara ...................... 346/140 R |
| 4,345,262 A | 8/1982 | Shirato et al. .......... 346/140 R |
| 4,391,960 A | 7/1983 | Kleine et al. ................. 526/74 |
| 4,459,600 A | 7/1984 | Sato et al. .............. 346/140 R |
| 4,463,359 A | 7/1984 | Ayata et al. ................. 346/1.1 |

(List continued on next page.)

FOREIGN PATENT DOCUMENTS

| EP | 0 943 666 A2 | 9/1999 |
| EP | 0 997 288 A2 | 5/2000 |
| EP | 0 997 506 A1 | 5/2000 |
| JP | 54-56847 A | 5/1979 |
| JP | 57-44605 A | 3/1982 |
| JP | 59-123670 A | 7/1984 |
| JP | 59-138461 A | 8/1984 |
| JP | 60-71260 A | 4/1985 |
| JP | 8-73791 A | 3/1996 |
| JP | 2783647 B2 | 8/1998 |
| JP | 2803134 B2 | 9/1998 |
| JP | 10-329403 A | 12/1998 |
| JP | 2881847 B2 | 2/1999 |
| JP | 11-209673 A | 8/1999 |

*Primary Examiner*—Helene Klemanski
(74) *Attorney, Agent, or Firm*—Fitzpatrick, Cella, Harper & Scinto

(57) ABSTRACT

An ink set which comprises a black ink containing an aqueous medium and a pigment dispersed in the aqueous medium by an action of an ionic group, and at least two color inks each containing a coloring material and an aqueous medium, wherein (i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and (ii) at least one of the color inks contains at least one of a coloring material and an additive that destabilize dispersion stability of the pigment in the black ink. The ink set can provide a high quality multicolor image keeping color balance after long preservation and showing less bleeding between black and color regions.

44 Claims, 14 Drawing Sheets

U.S. PATENT DOCUMENTS

| | | | |
|---|---|---|---|
| 4,558,333 A | 12/1985 | Sugitani et al. | 346/140 R |
| 4,608,577 A | 8/1986 | Hori | 346/140 R |
| 4,723,129 A | 2/1988 | Endo et al. | 346/1.1 |
| 4,740,796 A | 4/1988 | Endo et al. | 346/1.1 |
| 5,091,009 A | 2/1992 | Nogami et al. | 106/287.1 |
| 5,218,376 A | 6/1993 | Asai | 346/1.1 |
| 5,221,497 A | 6/1993 | Watanabe et al. | 252/313.2 |
| 5,451,251 A | 9/1995 | Mafune et al. | 106/31.43 |
| 5,466,282 A | 11/1995 | Eida et al. | 106/31.48 |
| 5,536,306 A | 7/1996 | Johnson et al. | 106/31.27 |
| 5,599,386 A | 2/1997 | Sano et al. | 106/31.48 |
| 5,772,742 A | 6/1998 | Wang | 106/31.27 |
| 6,039,793 A * | 3/2000 | Gundlach et al. | 106/31.28 |
| 6,062,674 A * | 5/2000 | Inui et al. | 347/43 |
| 6,280,513 B1 | 8/2001 | Osumi et al. | 106/31.6 |
| 6,281,917 B1 | 8/2001 | Katsuragi et al. | 347/100 |
| 6,460,987 B1 * | 10/2002 | Katsuragi et al. | 347/100 |
| 6,460,988 B1 * | 10/2002 | Mafune et al. | 347/100 |
| 6,503,307 B1 * | 1/2003 | Noguchi | 106/31.27 |
| 2002/0018107 A1 * | 2/2002 | Yakushigawa et al. | 347/100 |
| 2002/0043177 A1 * | 4/2002 | Koitabashi et al. | 106/31.27 |

\* cited by examiner

AFTER 1 μS

AFTER 2μS

AFTER 3μS

AFTER 4 µS

AFTER 5 µS

AFTER 6 μS

AFTER 7 μS

INK SET, INK JET RECORDING METHOD, RECORDING UNIT, INK CARTRIDGE, INK JET RECORDING APPARATUS, BLEED-ALLEVIATING METHOD, AND METHOD FOR IMPROVING FIXABILITY OF BLACK IMAGE

BACKGROUND OF THE INVENTION

1. Field of the Invention

The present invention relates to an ink set suitable for ink jet recording, an ink jet recording method, a recording unit, an ink cartridge, an ink jet recording apparatus, a bleed alleviating method, and a method for improving fixability of a black image.

2. Related Background Art

Conventionally, aqueous inks are used for color recording by using an ink jet recording method. In the aqueous ink a dye of an individual color tone is dissolved in a water-soluble medium. Usually, three color inks of cyan, magenta, and yellow are used.

These inks are required to have not only reliability in an ink jet system, but also to provide sufficient image density, good drying performance, no bleeding, no blotching with water, alcohol and the like, good weather resistance to the recorded image. Particularly, as high quality ink jet images comparable to silver salt photographs have been realized, not only good image quality but also a longer life is required for recorded images.

SUMMARY OF THE INVENTION

Since fading by light exposure is a main cause of deterioration of the storage stability of an image, formation of an image having more light fastness is required. When a recorded image produced with an ink is exposed to light, the dye in an image produced with an ink tends to deteriorate by light resulting in fading conspicuous. Hence, light fastness of the image has been improved by using dyes having a structure which is excellent in light fastness for color inks and/or by using a recording medium which can prevent light fading.

However, the color balance of the image tends to be upset when the entire image is exposed to light, and the entire image whose color balance is upset may give the impressin that the quality is worsened. For example, when a multicolor image is formed with cyan, magenta, and yellow inks, and if light fastness of the cyan image is smaller than that of the other two colors, the part formed with the cyan ink will fade more to give a less bluish image after light fading in comparison with the image immediately after printing.

Japanese Patent Application Laid-Open No. 10-329403 discloses an ink set of cyan, magenta and yellow inks, where the respective images' $\Delta E$, the images being produced with three color inks, are less than 25, 30 and 15, in a one-year pseudo-fading test with office light. However, a residual rate of reflection density is not discussed for each color, and the respective $\Delta E$s of the images formed with the respective color inks is large. Thus, the ink set is not said to produce an image having good light fastness. In addition, color balance of a full color image using these three colors is not described showing that the long-term storage stability is not intended. On such a technical background, the present inventors has been motivated to develop a color ink set which will produce images maintaining the color balance after long-term storage, and good image quality.

On the other hand, in order to form a high-quality multicolor ink-jet image, it is an important technical problem to alleviate bleed in a boundary region between a color image and a black image on the recording medium. Various ideas for combinations of color and black inks have been proposed to solve this problem, but it is completely unknown whether those ideas are also effective with the color ink set to produce images maintaining the color balance. There is not known any set of the color ink set and black ink that can alleviate the change of color balance with time as well as bleeding at the boundary.

An object of the present invention is to provide an ink set, which can provide an image with little change in color balance during long time, and at the same time can alleviate in a boundary region between a color image and a black image in a multicolor image.

Another object of the invention is to provide an ink jet recording method which can form a high-quality multicolor image with effectively alleviated bleeding and with a less change in the color balance in time sequence.

A still further object of the invention is to provide a recording unit and an ink jet recording apparatus which can form a high-quality multicolor ink jet recording image with a less change in the color balance in time sequence.

The still further object of the invention is to provide an ink cartridge which can form a high-quality multicolor image with a less change in the color balance in time sequence.

The still further object of the invention is to provide a method for alleviating bleeding in a multicolor ink jet recording image which can form a high-quality multicolor image with effectively suppressed bleeding and with a less change in the color balance in time sequence.

Still further object of the invention is to provide a method for improving fixability of a black image to a recording medium, which can form a high-quality multicolor image with less change in color balance in the color image in time sequence, and can improve fixability of the black image to the recording medium.

In consideration of the above described objects, the present inventors tested various inks and as a result, found that when color inks that provide respective images having a similar light fading ($\Delta E$) are used as a set, it can prevent image deterioration due to the color balance change after long-term storage. The inventor has also found that bleeding between a black image region and a colored image region can be effectively alleviated while maintaining the above color balance change suppressing effect by using a black ink containing a pigment dispersed in an aqueous medium by the action of the ionic group of the pigment, with the above color ink set but at least one of the color inks contains at least one of a coloring material and an additive that destabilizes the dispersion stability of the pigment in the black ink. This resulted in the achievemetn of the present invention.

According to one aspect of the present invention, there is provided an ink set.

According to another aspect of the present invention, there is provided an ink jet recording method.

According to still another aspect of the present invention, there is provided a recording unit.

According to still another aspect of the present invention, there is provided an ink cartridge.

According to still another aspect of the present invention, there is provided a recording apparatus.

According to still another aspect of the present invention, there is provided an ink set.

According to still another aspect of the present invention, there is provided an ink set.

According to still another aspect of the present invention, there is provided a method for alleviating bleeding.

According to still another aspect of the present invention, there is provided a method.

DETAILED DESCRIPTION OF THE INVENTION

Figure 1:
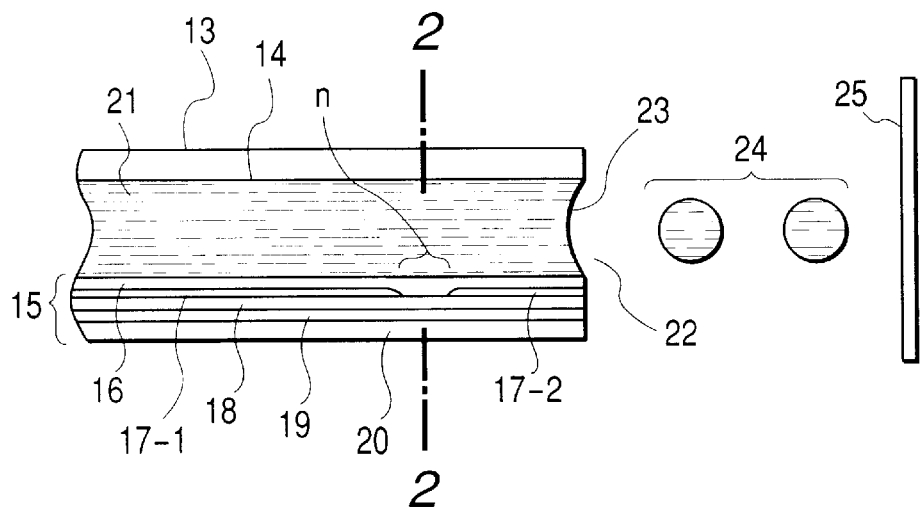
FIG. 1 is a longitudinal sectional view showing an embodiment of a head of an ink jet recording apparatus.

The feature of the present invention is that the color images in a multicolor image formed with individual color inks have almost the same light fastness. Light fastness of an image formed with a color ink can be expressed, for example, by using a color space such as CIELAB. According to the CIELAB color space, a color is expressed by using 3 items, i.e., $L^*$, $a^*$, and $b^*$, where $L^*$ defines lightness of color and ranges from 0 (black) to 100 (white) and $a^*$ and $b^*$ define the color hue and chroma characterics of a given color respectively.

The $\Delta E$ used hereby indicates the difference in the CIELAB color space between the color of the initial image and the color of the image after light exposure. A difference in $\Delta E$ represents the difference of light fading degree between two different color images. Thus, larger difference in $\Delta E$ means larger difference of light fading between these two colors. $\Delta E$ is expressed by the following equation.

$$\Delta E=[(L^*_1-L^*_2)^2+(a^*_1-a^*_2)^2+(b^*_1-b^*_2)^2]^{1/2} \quad \text{(Equation 1)}$$

i.e., $\Delta E=(\Delta L^{*2}+\Delta a^{*2}+\Delta b^{*2})^{1/2}$ (Equation 2)

Using $\Delta E$, one can know light fastness of an image formed with a color ink. In other words, when $\Delta E$ between immediately after printing and after light exposure is large, light fading is large. When the respective $\Delta E$s of the various colors in a multi-color image are almost equal with each other, color balance is maintained, and the multi-color image after light exposure gives the viewer little impression that the quality of the multi-color of image has deteriorated, even if light fading of every color image is recognizable. In addition, if the residual rate of reflection density of the respective image with respective color ink is large, total light fading of the image is little. Here, the residual rate of reflection density is the reflection density after light exposure expressed in percent to the reflection density of the image immediately after printing of 100%. It indicates a degree of conservation in the reflection density of the image after light fading; it is preferable that the residual rate of the reflection density of the respective image formed with respective color ink is 70% or higher and more preferably, 80% or higher.

The present invention will be described in detail with reference to preferable embodiments of the present invention.

Light Fastness Test

To evaluate light fastness, the light fastness test is used in the present invention. The light fastness test is preferably carried out under conditions presuming the sunlight passing through the window into a room, considering the environment where the image is actually preserved. The amount of exposure in the light fastness test is preferably 6000 klux·hr or higher in consideration of long term preservation. For example, a test performed with an illuminance of 63 klux for 100 hours corresponds to a test performed on the assumption that an image is preserved for three years or longer under indoor exposure of the sunlight at 5 klux·hour per day.

More preferably, the test is carried out following ISO10977 conditions, assuming sunlight through the window in a room.

According to the ISO standard, the illuminance is 6 klux; however, if a test of 6000 klux·hr or higher illuminance is carried out, the test period becomes too long. Therefore, unless obtained results are not contradictory, the illuminance may be increased to shorten the test period.

Recording Medium

The recording medium used in the present invention is not limited to any specific ones, but those having a coat layer such as glossy paper, coated paper and glossy film are preferably used. For high absorbency, coloring, and resolution, the recording media having a porous particulate layer or a porous polymer layer on the substrate are preferably used.

One example of the recording media used in the present invention has an ink receiving layer comprised of fine particles which form a porous structure, and the particles adsorbed the coloring material such as a dye or pigment in the ink form the image. Such a recording medium is especially preferable for ink jet recording. A type of ink receiving layer, so called absorbing layer that absorbs ink in the voids in the ink receiving layer, is preferable. The absorption-type ink receiving layer comprises a porous layer formed with fine particles as a main component with or without a binder and other additives. The particle materials include, for example, inorganic pigments such as silica, clay, talc, calcium carbonate, kaolin, alumina or aluminum oxide such as hydrated alumina, diatomaceous earth, titanium oxide, hydrotalcite, and zinc oxide; and organic pigments such as urea-formalin resin, ethylene resin, and styrene resin. At least one of these materials can be used. As the binder, for example, water-soluble polymer and latex can be used. Examples of such binders include poly(vinyl alcohol) or modified polyvinyl alcohol); starch or modified starch; gelatin or modified gelatin; gum arabic; cellulose derivatives such as carboxymethyl cellulose, hydroxyethyl cellulose, and hydroxyproylmethyl cellulose; SBR latex; NBR latex; methylmethacrylate-butadiene copolymer latex; functional-group-modified polymer latex; vinyl copolymer latex such as ethylene-vinyl acetate copolymer; polyvinyl pyrrolidone; maleic anhydride or the copolymer thereof; and acrylate ester copolymer. If necessary, two or more binders can be used in combination. Other additives, such as dispersant, thickening agent, pH adjustor, lubricant, flow modifier, surfactant, antifoaming agent, fluorescent brightener, ultra-violet absorber and antioxidant, can also be used depending on the situation. Preferable ink receiving layer of the recording medium mainly comprises particles of average diameter 1 μm or smaller, and particularly preferably particles of silica and aluminum oxide of this size. The preferable silica particles are those exemplified by colloidal silica. Although colloidal silica is commercially available, particularly preferable colloidal silica is those described in, for example, Japanese Patent Registration No. 2803134 and Japanese Patent Registration No. 2881847. The preferable aluminum oxide particles include, for example, hydrated alumina particles. One suitable example of alumina pigments is hydrated alumina represented by the following formula (VI):

$$Al_2O_{3-n}(OH)_{2n} \cdot mH_2O \tag{VI}$$

wherein
n is an integer of 1, 2 and 3, m is a value between 0 and 10, preferably 0 and 5, and m+n is not 0. In most cases, mH$_2$O represents the eliminable water not participating in the formation of mH$_2$O crystal lattice; accordingly, m can be an integer or a value other than integers. Further, m may become 0 by heating this type of material.

Preferable hydrated alumina can be manufactured by the known methods as disclosed in U.S. Pat. No. 4242271 and U.S. Pat. No. 4202870 wherein aluminum alkoxide or sodium aluminate is hydrolyzed, or as disclosed in Japanese Patent Publication No. 57-44605 wherein an aqueous solution of sodium aluminate is neutralized by adding an aqueous solution of sodium sulfate, or of aluminum chloride.

Figure 24:
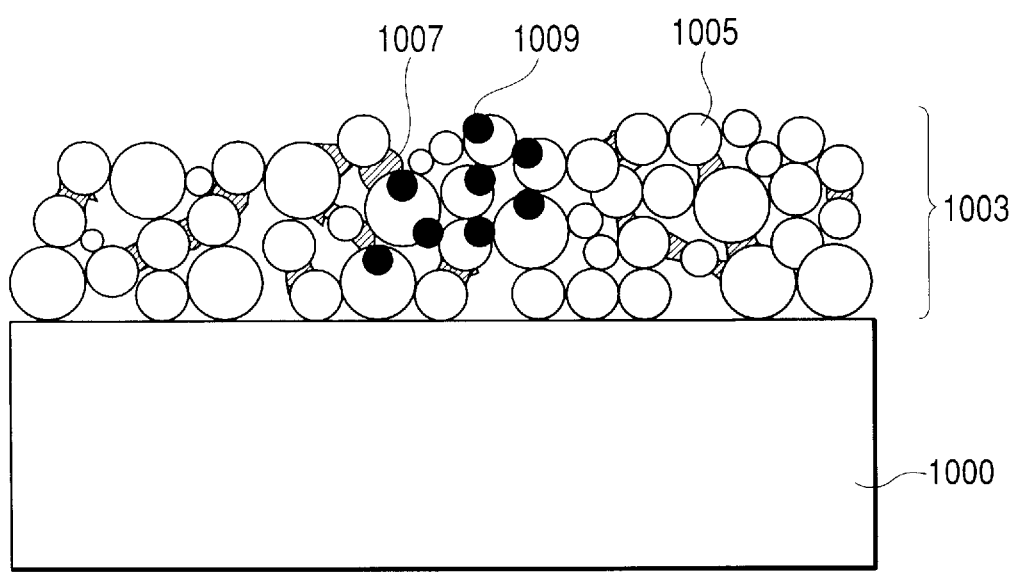
FIG. 24 is a schematic sectional view of a recording medium used in the present invention.

FIG. 24 is a schematic section of a so-called coated paper having an ink receiving layer on the substrate. In FIG. 24, the reference numeral 1000 denotes a substrate, 1003 denotes a coating layer (the ink receiving layer) held on the substrate 1000. The coating layer 1003 is a porous layer containing fine particles 1005 fixed with a binder 1007. When an ink droplet is applied onto such a coat paper, the coloring material 1009 in the ink is adsorbed on the surface of the fine particles 1005, and the adsorbed coloring material forms an image.

Black Ink

As the pigment in the black ink, carbon black is preferably used. The carbon black may be dispersed in the ink by itself (self-dispersing) or by the aid of a dispersant.

Self-dispersing Carbon Black

Examples of self-dispersing carbon black are those having at least an ionic hydrophilic group (anionic or cationic) bonded to the surface thereof directly or via an atomic group. Using such a carbon black, addition of a dispersant for dispersing the carbon black can be reduced or dispensed.

Examples of the carbon black having anionic groups bonded to the surface are those having any of such hydrophilic groups:

to the surface of carbon black.

In the above formulae, M2 is hydrogen, alkali metal, ammonium or organic ammonium. Of these, carbon black anionically charged by bonding —COO(M2) or —SO$_3$(M2) to the surface thereof is particularly preferably used in this embodiment, since its dispersibility in the ink is good.

Of those represented by "M2" in the above-described hydrophilic groups, specific examples of the alkali metal include Li, Na, K, Rb and Cs, and specific examples of the organic ammonium include methylammonium, dimethylammonium, trimethyl-ammonium, ethylammonium, diethylammonium, triethyl-ammonium, methanol ammonium, dimethanol ammonium and trimethanol ammonium.

Ink containing a self-dispersing carbon black of which M2 is ammonium or organo-ammonium can improve the water fastness of recorded images and thus especially preferable in this embodiment. This is because the ammonium salt will decompose and evaporate when the ink is applied on the recording medium. The self-dispersing carbon black of which M2 is ammonium can be prepared by treating a self-dispersing carbon black in which M2 is an alkali metal by the ion exchange method to replace the alkali metal with ammonium, or by first converting it to the H-type (free acid type) with an acid and then adding ammonium hydroxide to change M2 to ammonium.

As a method for preparing the anionically charged self-dispersing carbon black may be a method in which carbon black is subjected to an oxidation treatment with sodium hypochlorite. According to this method, a —COONa group can be chemically bonded to the surface of carbon black.

Meanwhile, various hydrophilic groups as mentioned above may be bonded directly to the surface of black carbon, or may be indirectly bonded via an atomic group laid between the surface and the hydrophilic group.

Here, specific examples of such an atomic group include straight or branched alkylene groups having 1 to 12 carbon atoms, substituted or unsubstituted phenylene groups and substituted or unsubstituted naphthylene groups. As the substituents for the phenylene groups and naphthylene groups, there are straight or branched alkyl groups having 1 to 6 carbon atoms. Specific examples of combinations of the atomic group and the hydrophilic group include —C$_2$H$_4$—COOM, —Ph—SO$_3$M and Ph—COOM, where Ph represents a phenyl group and M an alkaline metal.

In this aspect, one or more kinds of self-dispersing carbon black selected from the above types may be used as the coloring material of the ink. The content of a self-dispersing carbon black is preferably in the range of from 0.1 to 15% by weight, more specifically, from 1 to 10% by weight to the total weight of ink. Within this range, the self-dispersing carbon black can retain a sufficient dispersion state in the ink. Furthermore, in order to adjust the color tone of the ink, one or more dyes may be added to the ink as the coloring material in addition to the self-dispersing carbon black.

Ordinary Carbon Black

It is also possible to use ordinary carbon black, instead of the self-dispersing carbon black. For example, carbon black pigments such as furnace black, lamp black, acetylene black, and channel black may be used. Those carbon black pigments include Raven 7000, Raven 5750, Raven 5250, Raven 5000, Raven 3500, Raven 2000, Raven 1500, Raven 1250, Raven 1200, Raven 1190ULTRA-11, Raven 1170, Raven 1255 (Up to this point Columbia products), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (Up to this point Cabot products), Color Black FW1, Color Black FW2, Color Black FW2V, Color Black FW18, Color Black FW200, Color Black S150, Color Black S160, Color Black S170, Recordex 35, Recordex U, Recordex V, Recordex 140U, Recordex 140V, Special Black 6, Special Black 5, Special Black 4A, Special Black 4 (Up to this point Degusa products), No. 25, No. 33, No. 40, No. 47, No. 52, No. 900, No. 2300, MCF-88, MA 600, MA 7, MA 8, and MA 100 (Up to this point Mitsubishi Chemical products). Known carbon black also may be used without being limited to the above carbon blacks. Furthermore, fine particles of magnetic material such as ferrite, and titanium black may be used as a black pigment.

When those normal carbon blacks are used as a coloring material for black ink, preferably a dispersant is added in ink to disperse them stably in aqueous medium. A dispersant which is preferably used has an ionic group which functions to disperse carbon black stably in aqueous medium. The above described dispersants include stylene-acrylic acid copolymer, stylene-acrylic acid-alkyl acrylate copolymer, stylene-maleic acid copolymer, stylene-maleic acid-alkyl acrylate copolymer, stylene-methacrylic acid copolymer, stylene-methacrylic acid-alkyl acrylate copolymer, stylene-maleic acid halfester copolymer, vinylnaphthalene-acrylic acid copolymer, vinylnaphthalene-maleic acid copolymer, and stylene-maleic anhydride-maleic acid halfester copolymer, or their salts. Of all copolymers described above those having a weight average molecular weight in the range of 1,000 to 30,000 are preferred, more preferably in the range of 3,000 to 15,000.

Salts Contained in the Black Ink

Presence of a salt in the black ink can prevent the image quality from greatly varying due to the type of the recording medium, and the ink can stably form high quality images of very high density. The black ink makes optical density of a first black image formed only with the black ink almost the same as that of a second black image formed with the black ink and a color ink containing at least one of a coloring material and an additive that destablize dispersion stability of the black ink. While color tone of the first black image may sometimes be slightly different from that of the second black image, such a difference can visually be ignored.

As the salt contained in the ink according to this aspect, it is preferable to use at least one selected from the group consisting of $(M1)_2SO_4$, $CH_3COO(M1)$, $Ph\text{-}COO(M1)$, $(M1)NO_3$, $(M1)Cl$, $(M1)Br$, $(M1)I$, $(M1)_2SO_3$ and $(M1)_2CO_3$. Here, M1 is an alkali metal, ammonium or an organo-ammonium and Ph means a phenyl group.

As the specific examples of the alkali metal, there are Li, Na, K, Rb, and Cs, and as the specific examples of organo-ammonium, there are methyl ammonium, dimethyl ammonium, trimethyl ammonium, ethyl ammonium, diethyl ammonium, triethyl ammonium, trimethanol ammonium, dimethanol ammonium, trimethanol ammonium, ethanol ammonium, diethanol ammonium and triethanol ammonium. Among these salts, sulfates (e.g., potassium sulfate) and benzoates (e.g., ammonium benzoate) are specifically compatible with self-dispersing carbon black, and the ink containing such a salt can form a high quality ink jet image on various recording medium, probably because of its excellent solid-liquid separation effect when applied onto a recording medium.

The salt content in the ink is preferably in the range of from 0.05 to 10% by weight, especially from 0.1 to 5% by weight of the total ink weight. By setting the contents of the self-dispersing carbon black and the salt to the above mentioned ranges, a superior effect can be obtained.

Aqueous Medium in Black Ink

The aqueous medium of the black ink of the present invention may be water or a mixture of water and a water-soluble organic solvent, where especially preferable water-soluble organic solvents are those that can prevent drying of the ink.

Specific examples include $C_1$-$C_4$ alkyl alcohols such as methyl alcohol, ethyl alcohol, n-propyl alcohol, iso-propyl alcohol, n-butyl alcohol, sec-butyl alcohol, and tert-butyl alcohol; amides such as dimethyl formaldehyde and dimethyl acetamide; ketones or ketoalcohols such as acetone and diacetone alcohol; ethers such as tetrahydrofurane and dioxane; polyalkylene glycols such as polyethylene glycol and polypropylene glycol; alkylene glycols with a $C_2$-$C_6$-alkylene group such as ethylene glycol, propylene glycol, butylene glycol, triethylene glycol, 1,2,6-hexane triol, thio-diglycol; hexylene glycol and diethylene glycol; lower alkyl ether acetates such as polyethylene glycol monomethylether acetate; glycerol; lower alkyl ethers of polyhydric alcohols such as ethylene glycol monomethyl- (or monoethyl-)ether, diethylene glycol methyl- (or ethyl-) ether and triethylene glycol monomethyl- (or monoethyl-)ether; polyhydric alcohols such as trimethylol propane and trimethylol ethane; N-methyl-2-pyrrolidone, 2-pyrrolidone and 1,3-dimethyl-2-imidazolidinone.

Such water-soluble organic solvents may be used singly or as a mixture. It is desirable to use deionized water.

The content of the water-soluble organic solvent in the ink of the invention is not especially limited, but preferably lies within the range of from 3 to 50% by weight on the basis of the total weight of the ink. The content of water in the ink preferably lies within the range of from 50 to 95% of the ink by weight.

Ink Properties; Ink-Jet Ejection Properties and Penetrability into the Recording Medium The black ink according to this aspect can be used for ink-jet recording as well as for hand-writing tools. As the ink-jet recording method, there are a recording method in which a mechanical energy is applied to the ink to eject an ink droplet and a recording method in which a thermal energy is applied to the ink to eject an ink droplet by the action of a bubble in the ink, for both of which the ink according to the present invention is especially suitable.

When the black ink of the present invention is used for ink-jet recording, the ink should have properties of ejectability from an ink-jet head. From this point of view, the ink has liquid properties such as the viscosity of 1-15 mPa·s, and the surface tension of preferably 25 mN/m or more, more preferably, 1 to 5 mPa·s and 25 to 50 mN/m.

An index indicating the penetrability of ink into a recording medium is the Ka value determined by the Bristow method. Namely, when the penetrability of an ink is expressed by the ink amount V per $m^2$, the penetration amount V ($ml/m^2 = \mu m$) of the ink to a recording medium after a predetermined time t from the ejection of an ink droplet is expressed by the Bristow equation:

$$V = Vr + Ka(t-tw)^{1/2},$$

where tw is a contact time and Vr is an amount of ink absorbed into the rough portion of the recording medium.

Here, immediately after the landing of an ink droplet to the surface of the recording medium, almost all ink is absorbed in the rough portion of the recording medium (uneven surface portion of the recording medium) and nearly no ink has penetrated inside the recording medium. This period is defined as the contact time (tw) and the amount of ink absorbed in the rough portion during the contact time is defined as Vr.

After the contact time, the amount of the ink penetrating into the recording medium increases in proportion to ½ power of the elapsed time exceeding the contact time, i.e., (t-tw). Ka is a proportional coefficient of this increment and corresponds to the penetration speed. The Ka value can be determined by using a test device on dynamic penetrability of liquid by the Bristow method (e.g., Dynamic Penetrability Testing Device S, trade name, a product of TOYO Seiki Mfg., Ltd.).

Furthermore, in the inks of the present invention, it is preferable to set the Ka value to less than $1.5 \text{ ml} \cdot \text{m}^{-2} \cdot \text{msec}^{-\frac{1}{2}}$, more preferably, from 0.2 to less than 1.5, for further improvement of the image quality. When the Ka value is less than $1.5 \text{ ml} \cdot \text{m}^{-2} \cdot \text{msec}^{-\frac{1}{2}}$, the solid-liquid separation takes place at an early stage of the ink penetration process into the recording medium, to give high quality images with little feathering.

Here, the Ka value by the Bristow method in the present invention is determined by using plain paper as the recording medium, such as PB paper (Canon) for copiers employing the electrophotographic process, page printers (laser beam printers), and printers employing the ink-jet recording process, and PPC paper to be used for copiers of the electrophotographic process. The measurement is carried out in presumptive office conditions such as a temperature of from 20 to 25° C. and humidity of from 40 to 60%.

Preferably, an aqueous medium which can provide the ink with the above mentioned desirable properties contains glycerol, trimethylol propane, thiodiglycol, ethylene glycol, diethylene glycol, isopropyl alcohol and acetylene alcohols.

Color Ink

According to the present invention, at least one color ink of the ink set should destabilize the dispersion stability of the pigment in the black ink when the color ink contact with the black ink. Destabilization of the dispersion stability of the pigment leads to phenomena such as aggregation and precipitation of the pigment, and thickening of the ink. Thickening means that when two inks (hereby, the black ink and the color ink) are mixed, the viscosity of the mixture becomes higher than that of either of the both inks. Specifically, embodiments of such a color ink are:

(1) A color ink containing a coloring material that destabilizes the dispersion stability of the pigment in the black ink, when the inks are mixed; or
(2) A color ink containing an additive that destabilizes the dispersion stability of the pigment in the black ink, when the inks are mixed.

Specific examples of the embodiment (1) are the following i) and ii).

i) The pigment in the black ink has an anionic group and the coloring material of the color ink has an cationic group.

In this example, when the color ink is mixed with the black ink, the cationic group of the coloring material in the color ink reacts with the anionic group of the pigment in the black ink break the dispersion stability of the pigment in the black ink, which results in the pigment aggregation and ink thickening.

ii) The pigment in the black ink has a cationic group and the coloring material of the color ink has an anionic group.

In this example, when the color ink contact with the black ink, the anionic group of the coloring material in the color ink reacts with the cationic group of the pigment in the black ink break the dispersion stability of the pigment in the black ink, which results in the pigment aggregation and ink thickening.

Specific examples of the embodiment (2) are the following iii) to v).

iii) The pigment in the black ink has an anionic group and the color ink contains at least one polyvalent metal salt of a polyvalent metal cation such as $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

In this example, when the color ink contact with the black ink, the polyvalent metal cation in the color ink reacts with the anionic group of the pigment in the black ink break the dispersion stability of the pigment in the black ink, which results in the pigment aggregation and ink thickening. Preferably, the polyvalent metal salt is contained in the color ink in the range from about 0.1 to 15%, more preferabely 2 to 5%, by weight to the total weight of the color ink.

In this example, the polyvalent metal salt is preferably a nitrate salt or an acetate salt.

iv) The pigment in the black ink stays stably dispersed at a pH ranging from 3 to 7 and the pH of the color ink is made from 8 to 10.

In this example, when the color ink contact with the black ink, the pH of the black ink rises and the dispersion stability of the pigment is broken, which results in the pigment aggregation and ink thickening.

v) The pigment in the black ink stays stably dispersed in the pH range from 7 to 11 and the pH of the color ink is made 3 to 6.

In this example, when the color ink contact with the black ink, the pH of the black ink drops and the dispersion stability of the pigment is broken, which results in the pigment aggregation and ink thickening.

Use of such a set of a color ink and a black ink as described above allows, for example, superimposing the black ink and the color ink to form a high-quality multicolor image with reduced bleeding at a boundary between the black image and the color image, as well as with an excellent long-term preservability of the color image region.

Coloring Material

In the present invention, the coloring materials for the color ink are, preferably, water soluble coloring material listed in the Color Index such as xanthene dyes, triphenyl methane dyes, anthraquinone dyes, monoazo dyes, disazo dyes, trisazo dyes, tetraazo dyes, and copper phthalocyanine dyes. Ink may contain one or more coloring materials.

These coloring materials are preferably contained in the ink in the range of from 0.1 to 15.0% by weight and more preferably, from 0.5 to 5.0% by weight to the total ink. In the case when the dispersion stability of the pigment in the black ink is to be destabilized by the coloring material in the color ink, the coloring material is selected from conventional coloring materials in accordance with the gist of the present invention as described in i) and ii) above.

When a magenta ink is contained in an ink set according to the present invention, it is preferable to use the coloring materials expressed by the following general formula (I):

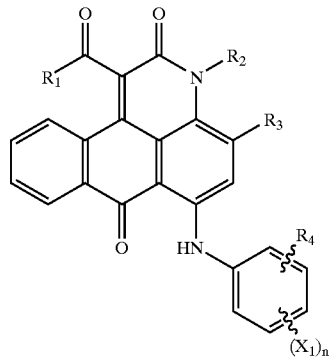

Formula (I)

In the general formula (I), $R_1$ represents a substituted or unsubstituted alkoxy group or a substituted or unsubstituted aryl group, $R_2$ and $R_4$ independently represent a hydrogen atom or a substituted or unsubstituted alkyl group, and $R_3$ is selected from the group consisting of a hydrogen atom, a substituted or unsubstituted alkyl group, a substituted or unsubstituted alkoxy group, a substituted or unsubstituted aryloxy group, or a halogen atom. $X_1$ represents a carboxyl group or a salt thereof or a sulfonic acid group or a salt thereof. n represents 1 or 2).

More specifically, $R_1$ is exemplified by, for example, a linear or branched linear alkoxy group of 1 to 4 carbons and a substituted or unsubstituted phenyl group, where the substituent of phenyl group includes, for example, a methyl group, a hydroxyl group, a nitro group, sulfonic acid group, or the salt thereof, carboxyl group or the salt thereof, and a halogen atom (fluorine, chlorine, bromine etc.). $R_2$ is, for example, exemplified by a hydrogen atom, a linear or branched linear lower alkyl group of 1 to 4 carbons. $R_3$ is, for example, exemplified by a hydrogen atom, a linear or branched linear alkyl group of 1 to 4 carbons, and a linear or branched linear alkoxy group of 1 to 4 carbons and an aryloxy group such as a phenoxy group. The aryloxy group may have one or more substituents on the aryl ring such as a linear or branched linear alkyl group of 1 to 10 carbons, sulfonic acid group or a salt thereof, and carboxyl group or a salt thereof. $R_4$ is exemplified by a hydrogen atom, and a linear or branched linear lower alkyl group of 1 to 4 carbons. $X_1$ is, for example, exemplified by —COOM, —$SO_3$M (where, M is a hydrogen atom, an alkali metal such as Li and Na), ammonium ($NH_4$), an organic ammonium ($N(R_8)_4$)), where, $R_8$ includes methyl and ethyl.

Specific examples of the coloring material represented by the general formula (I) are as follows. Hereafter, M in the exemplified compounds I-1 to I-7 represents any one of H, Li, Na, $NH_4$, and $N(R_8)_4$.

Exemplified compound I-1

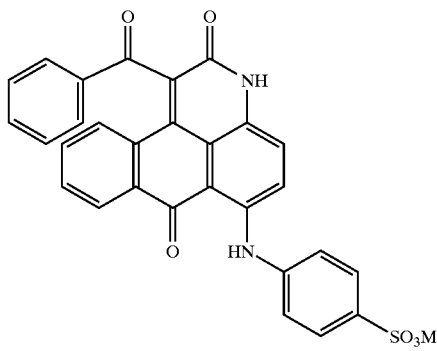

Exemplified compound I-2

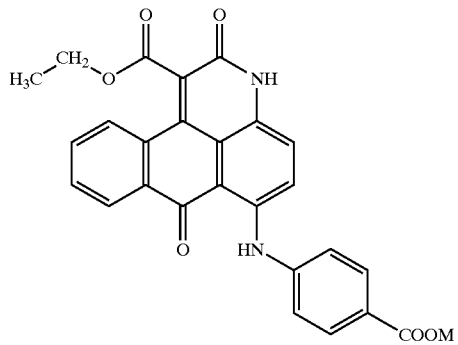

Exemplified compound I-3

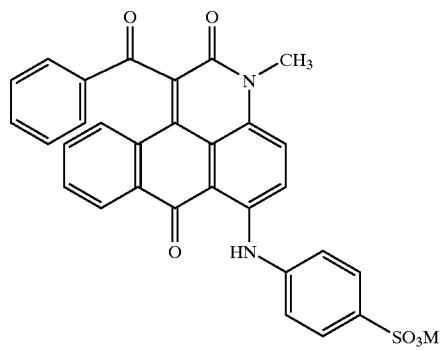

Exemplified compound I-4

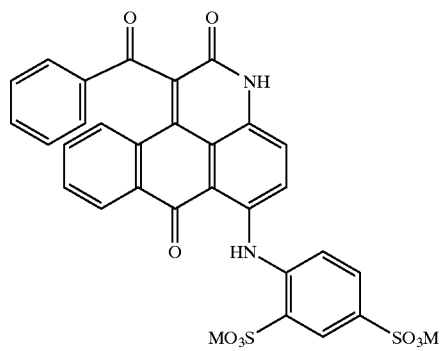

Exemplified compound I-5

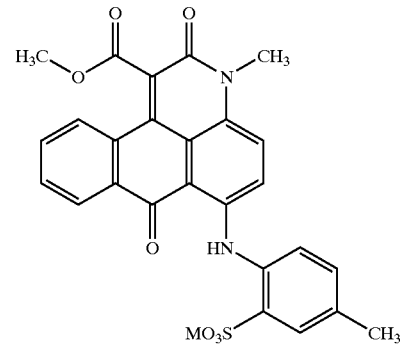

Exemplified compound I-6

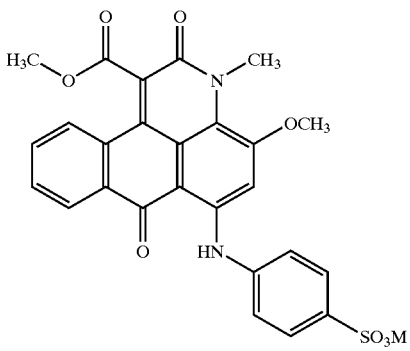

Exemplified compound I-7

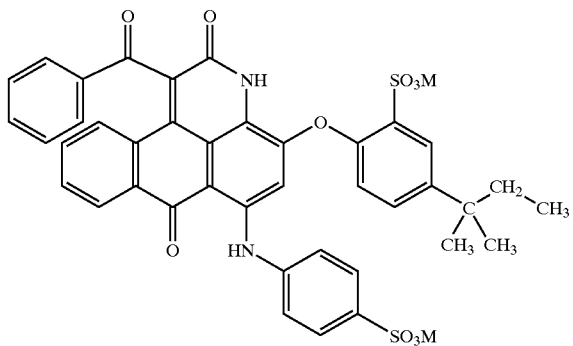

More preferably, the magenta ink contains at least one of the coloring material of the general formula (I) and at least one coloring materials selected from the coloring materials represented by the following general formulas (II) and (III) and coloring materials having a xanthene structure.

Formula (II)

[Formula II structure: Ar₁—N=N with naphthalene core bearing OH, HN-Ar₂, M₂O₃S, SO₃M₃]

In the formula (II) above, $Ar_1$ represents a substituted or unsubstituted phenyl group or a substituted or unsubstituted naphthyl group and $Ar_2$ is selected from the group consisting of an acetyl group, benzoyl group, 1,3,5-triazinyl group, a $SO_2\text{-}C_6H_5$ group, or $SO_2\text{-}C_6H_4\text{-}CH_3$ group. M is a counterion of the sulfonic acid group and represents a hydrogen atom, an alkali metal such as Li and Na, an ammonium ($NH_4$), or an organic ammonium ($N(R_9)_4$))., where, $R_9$ includes a methyl or ethyl group. The phenyl or naphthyl group of $Ar_1$ may have one or more substituents selected from, for example, a carboxyl group or a salt thereof, a sulfonic acid group or the salt thereof, or a linear or branched linear alkyl group of 1 to 4 carbons, a halogen atom such as fluorine, chlorine and bromine, alkoxy group of 1 to 4 carbons and an aryloxy group such as a phenoxy group. When $Ar_2$ is a benzoyl group or 1,3,5-triazinyl group, the benzene ring or 1,3,5-triazine ring may have a substituent such as a carboxyl group or the salt thereof, a halogen atom (fluorine, chlorine, bromine, etc.), a primary to tertiary amino groups, an alkoxy group, a hydroxyl group, and the like.

Formula (III)

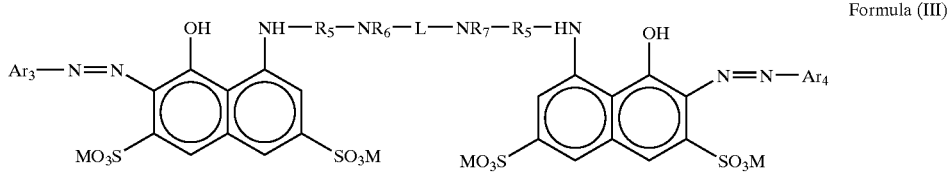

In the general formula (III) above, $Ar_3$ and $Ar_4$ represent independently a substituted or unsubstituted phenyl group or a substituted or unsubstituted naphthyl group. The substituents for a phenyl group and a naphthyl group includes, for example, a linear or branched linear alkyl group of 1 to 4 carbons, a linear or branched linear alkoxy group of 1 to 4 carbons, a hydroxyl group, a carboxyl group or a salt thereof, a sulfonic acid group or the salt thereof, or a halogen atom (fluorine, chlorine, bromine, and the like). At least one of $Ar_3$ and $Ar_4$ has a substituent being a carboxyl group or the salt thereof or a sulfonic acid group or the salt thereof. M is a counterion of a sulfonic acid group and represents any one of a hydrogen atom, an alkali metal such as Li and Na, ammonium ($NH_4$), and an organic ammonium ($N(R_{10})_4$)), where $R_{10}$ includes methyl and ethyl group. $R_5$ represents a 1,3,5-triazine-diyl group which may be substituted by a carboxyl group or the salt thereof, a halogen atom such as fluorine, chlorine and bromine, primary to tertiary amino groups, alkoxy group, hydroxyl group, and the like. $R_6$ and $R_7$ independently represent a hydrogen atom or a substituted or unsubstituted alkyl group, a substituted or unsubstituted alkenyl group, a substituted or unsubstituted aralkyl group, or an atomic group which forms together with an N atom a perhydroxyazine ring, and L represents a divalent organic linking group. $R_6$ and $R_7$ are, for example, a linear or branched alkyl group of 1 to 6 carbons, a linear or branched alkenyl group of 1 to 4 carbons, benzyl group and the like. The substituent for the alkyl group, alkenyl group, and benzyl group includes a hydroxyl group, carboxyl group or the salt thereof, and a sulfonic acid group or the salt thereof.

Specific examples of the coloring material represented by the general formula (II) above include, for example, C. I. Reactive Red 180 and those having the following structure and further, the compounds having a structure described in Japanese Patent Application Laid-Open No. 8-73791, Japanese Patent Application Laid-Open No. 11-209673.

Hereafter, M in the exemplified compounds II-8 to II-13 represents any one of H, Li, Na, $NH_4$, and $N(R_9)_4$.

Exemplified compound II-8

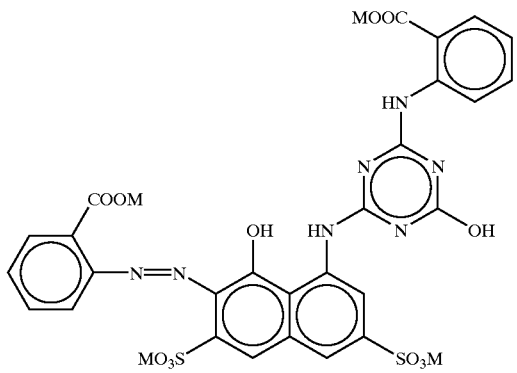

Exemplified compound II-9

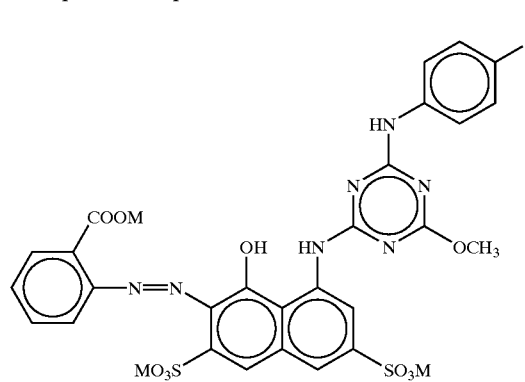

Exemplified compound II-10

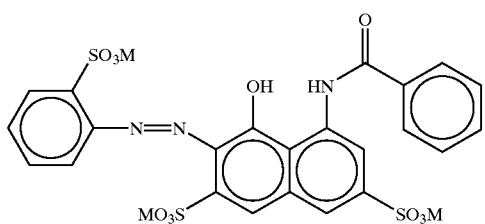

Exemplified compound II-11

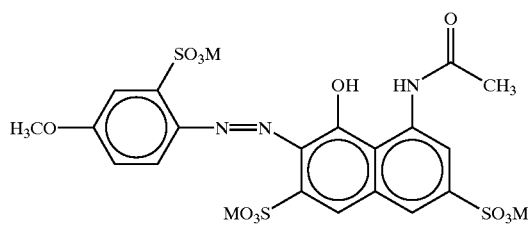

Exemplified compound II-12

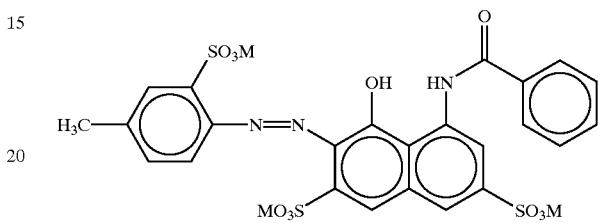

Exemplified compound II-13 (C. I. Red 249)

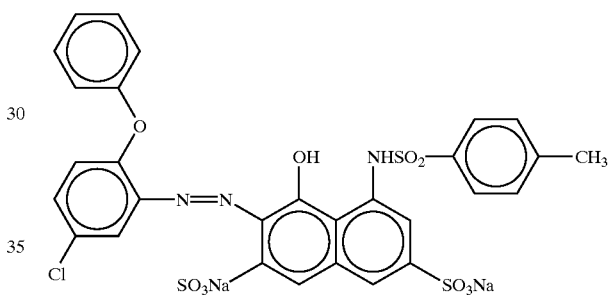

Specific examples of the coloring material represented by the general formula (III) above include, for example, those having the following structure. Hereafter, M in exemplified compounds III-14 to III-22 represents any one of H, Li, Na, $NH_4$, and $N(R_{10})_4$.

Exemplified compound III-14

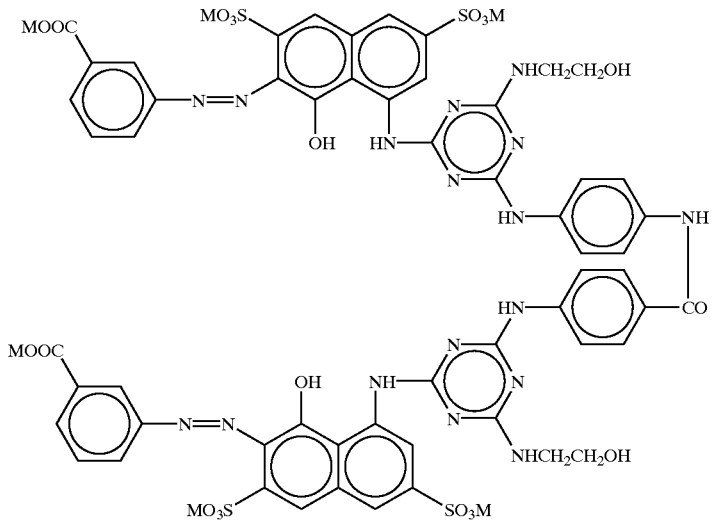

Exemplified compound III-15
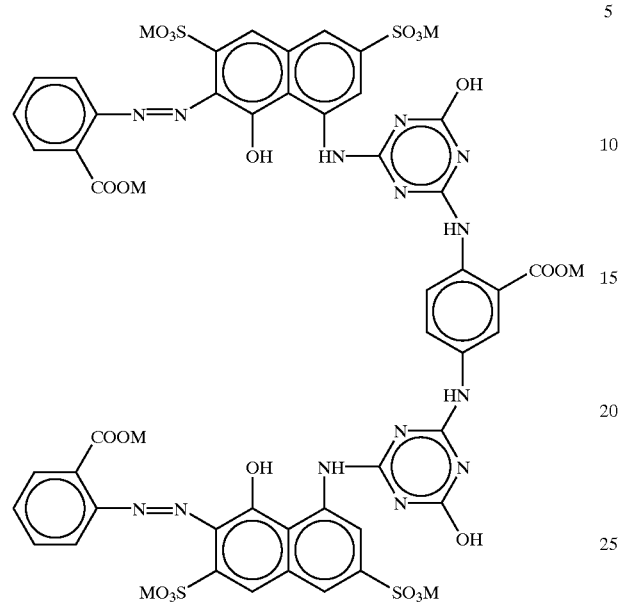
Exemplified compound III-17
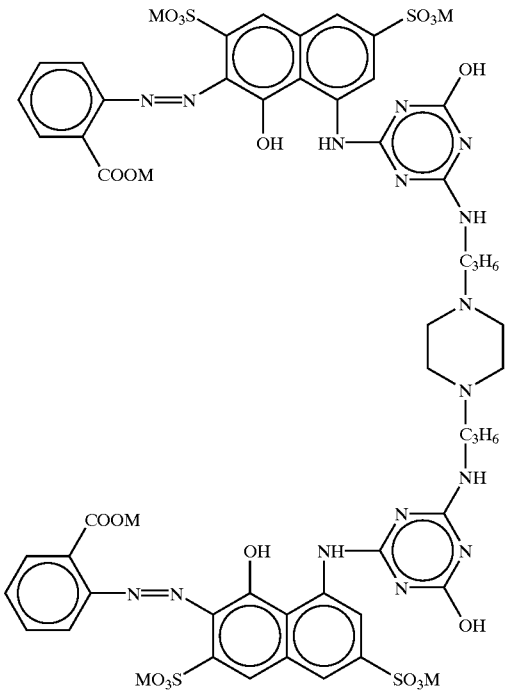
Exemplified compound III-16
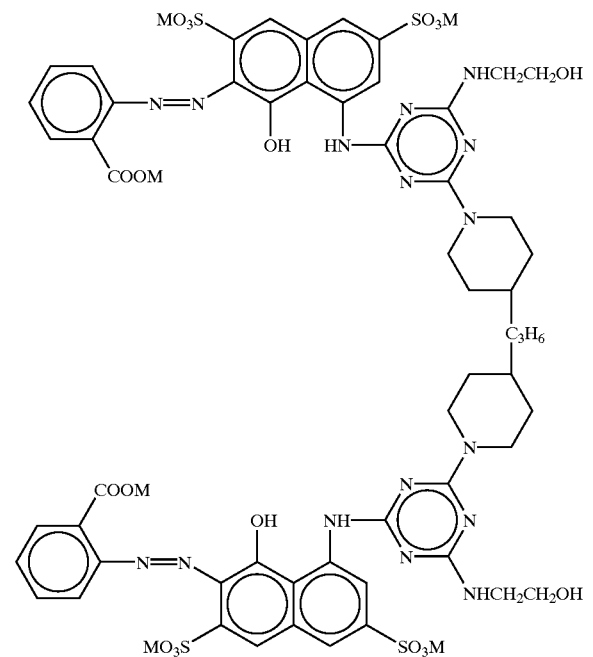
Exemplified compound III-18
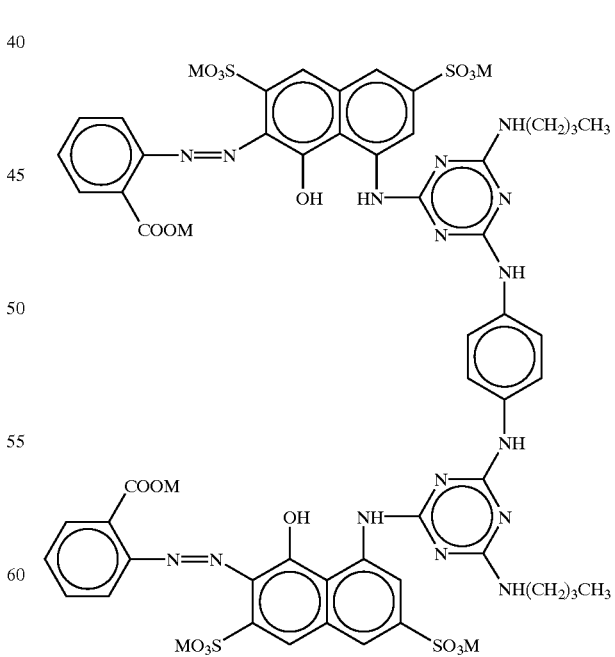

Exemplified compound III-19

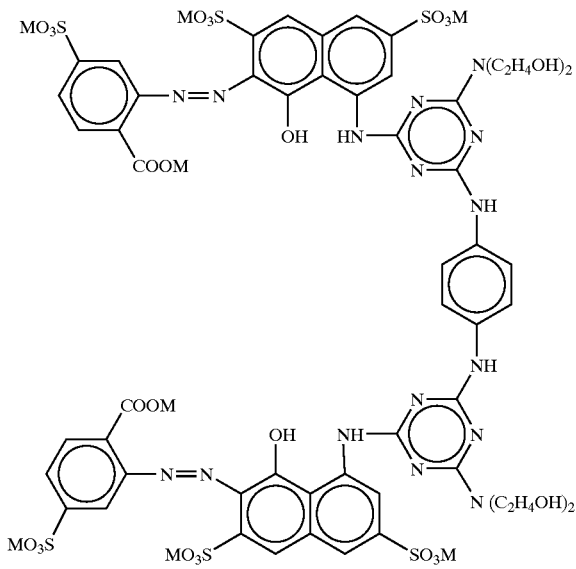

Exemplified compound III-20

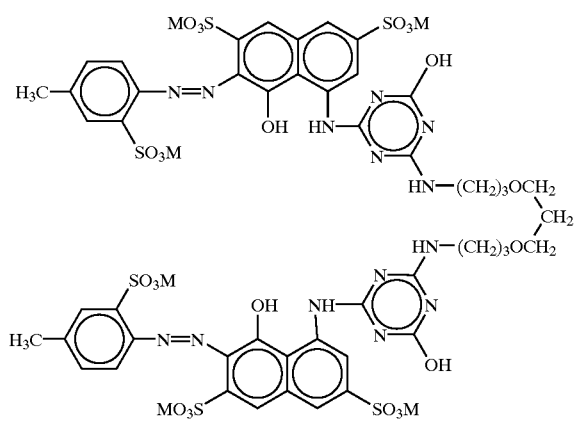

Exemplified compound III-21

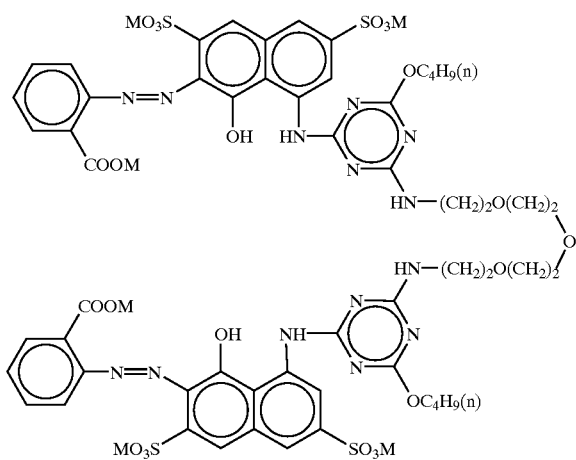

Exemplified compound III-22

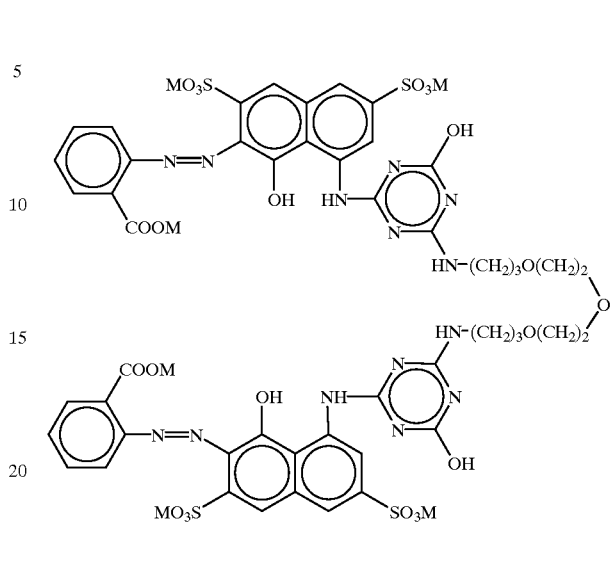

Specific examples of the coloring material having an xanthene structure include C. I. Acid Red 52, 92, 94 and 289.

When the magenta ink according to the present invention contains the coloring material of the general formula (I) and a coloring material other than the general formula (I) compounds (at least one selected from the coloring materials expressed by the general formula (II) and the general formula (III) and the coloring materials having an xanthene structure) in mixture, the weight ratio is preferably in the range of from 95:5 to 20:80, to obtain such effects as sharp color tone, high image density, and excellent light fastness.

When the ink set according to the present invention contains a cyan ink, it is preferable to use a coloring material having a copper phthalocyanine structure as the coloring material of the cyan ink. Specific examples of the coloring material having a copper phthalocyanine structure are C. I. Acid Blue 249, C. I. Direct Blue 86, C. I. Direct Blue 199, and C. I. Direct Blue 307. In addition to these copper phthalocyanine coloring materials, other cyan coloring material may be used together. However, in a case, the weight ratio of the copper phthalocyanine coloring material to the additional coloring material preferably ranges from 95:5 to 20:80.

When the ink set according to the present invention contains an yellow ink, it is preferable to use Direct Yellow 132 as the coloring material.

The ink set according to the present invention may further contain another black ink containing a dye as the coloring material. In that case, similarly to other color inks, the ink should have such light fading properties that the $\Delta E$ of the image formed with the black ink in the CIELAB color space indication system after simulated indoor light fading for 3 or more years does not differ from other $\Delta E$s by more than 10.

Dyes that can be used in such a dye-based black ink include, for example, those expressed by the following general formulae (IV) to (VI).

(IV)

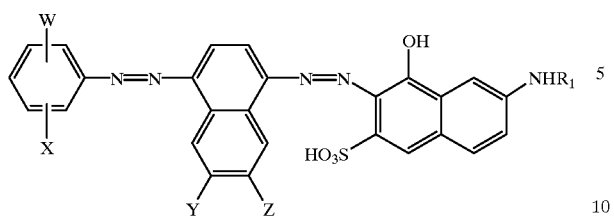

(where, W represents a carboxyl group, X represents a hydrogen atom, a carboxyl group, or a sulfone group, Y represents a hydrogen atom, a carboxyl group, or a sulfonic acid group, Z represents a hydrogen atom, a carboxyl group, or a sulfonic acid group, $R_1$ a hydrogen atom, an alkyl group substituted by at least one of carboxyl group, and alkoxy group, a substituted or unsubstituted phenyl group, or a substituted or unsubstituted alkanoyl group, respectively. The substituents of the phenyl group and alkanoyl group are exemplified by a hydroxyl group, a carboxyl group, a sulfonic acid group, and an alkoxy group).

In the general formula (IV), the preferred examples of the carboxyalkyl group represented by $R_1$ include a carboxyalkyl group of which alkyl moiety is $C_1$ to $C_6$ (carbon number is 1 to 6 and the same hereafter) and more preferably, $C_1$ to $C_4$.

(V)

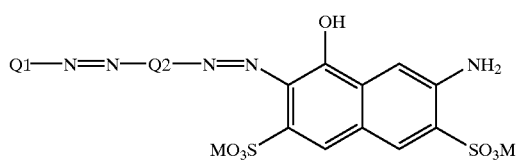

(VI)

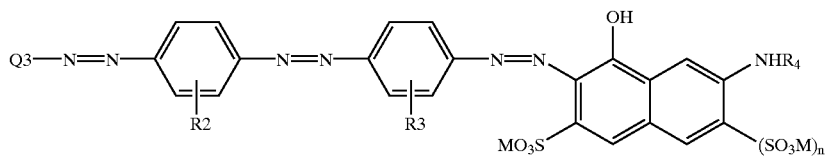

(wherein Q1 represents a phenyl or naphthyl group having at least one substituent selected from a lower alkylcarbonyl amino group and a lower alkoxy group, or a naphthyl group substituted by a sulfonic acid group; Q2 represents a naphthyl group substituted by a sulfonic acid group, or a phenyl group substituted by a lower alkoxy group; Q3 represents an unsubstituted or $SO_3M$ substituted phenyl or naphthyl group; $R_2$ and $R_3$ independently represent a lower alkyl group, a lower alkoxy group, or a lower alkylcarbonyl group; $R_4$ represents a hydrogen atom or a phenyl group substituted by a sulfonic acid group, n is 0 or 1, M is an alkali metal such as Li and Na, ammonium ($NH_4$), an organic ammonium ($N(R_{11})_4$) where $R_{11}$ may be methyl or ethyl.

In the dye structure expressed by the general formulae (V) and (VI) described above, the lower alkylcarbonyl amino group is preferably a $C_1$ to $C_4$ alkylcarbonyl amino group, the lower alkoxy group a $C_1$ to $C_4$ alkoxy groups, and the lower alkyl group a $C_1$ to $C_4$ alkyl group.

Specific examples of the dye expressed by the general formula (V) above include the following exemplified compounds 23 to 27.

Exemplified compound 23

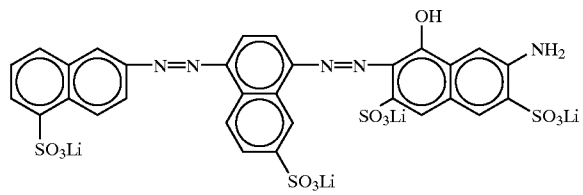

Exemplified compound 24

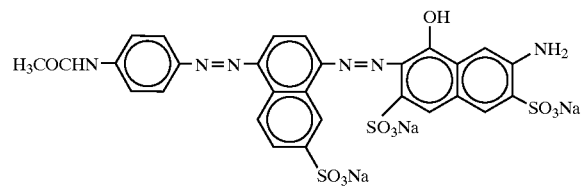

Exemplified compound 25

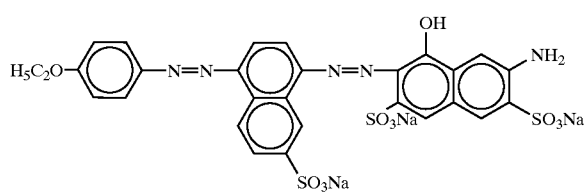

Exemplified compound 26

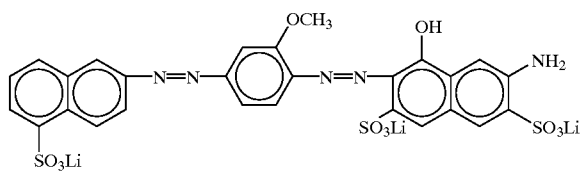

Exemplified compound 27
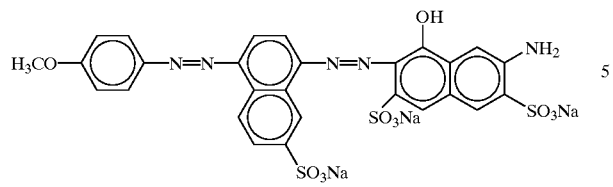
Specific examples of the dye expressed by the general formula (VI) include following exemplified compounds 28 to 32.
Exemplified compound 28
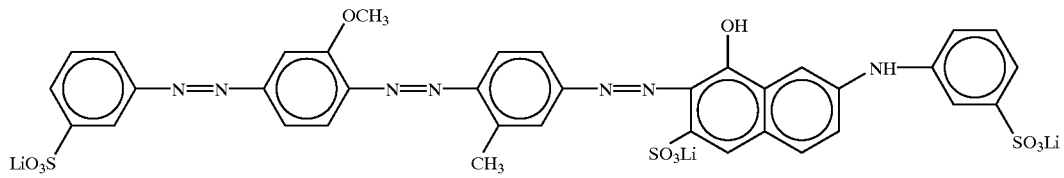
Exemplified compound 29
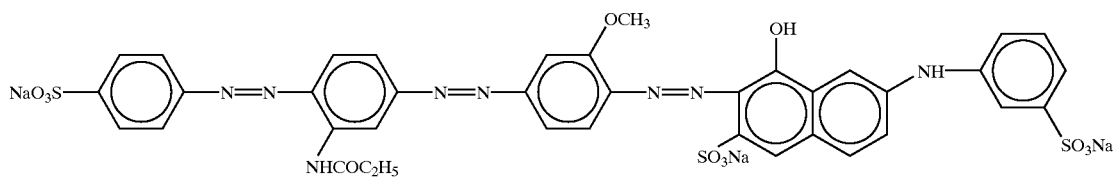
Exemplified compound 30
Exemplified compound 31
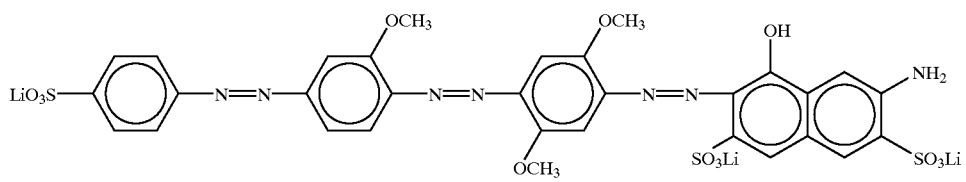
Exemplified compound 32
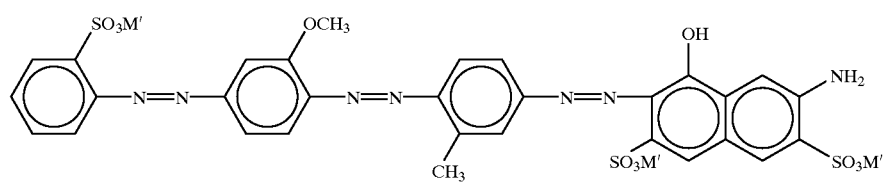
[M': NH(C$_2$H$_4$OH)$_3$]

Other than these, for example, C. I Direct Black 17, 19, 51, 71, 90, 108, 146, 154, 168, 195, C. I Food Blacks 1 and 2 can be exemplified. These black dyes may be used singly, or in a proper combination within the scope of the invention. In view of light fading properties, more preferable ink sets according to the present invention are those can provide images having respective ΔEs, the difference between respective ΔEs being within 10 (0 inclusive), and each image's the residual rate of reflection density of 70% or higher, more preferably 80% or higher under conditions for fading corresponding to psuedo-indoor sunlight fading through a window for 3 years or more.

An embodiment to achieve this is an ink set comprised of cyan, magenta, and yellow inks containing the above described coloring materials. Such an ink set is particularly good congeniality with a recording medium having an ink receiving layer of alumina hydrate fine particle among the various recording media as described above. The reason why the these coloring materials and the recording medium have good congeniality is not known clearly but it may be that the adsorption state of the coloring material to the alumina hydrate contributes to suppression of deterioration of the coloring material.

Here, a combination of the coloring materials for color inks that can provide the desired color tone and the light fastness at a very high level for the image is as follows.

Magenta ink: a blend of a coloring material of the formula (I) above, with at least one selected from the group consisting of the coloring materials represented by the formulas (II) and (III) and xanthene dyes. More specifically, a blend of Exemplified compound I-7, Exemplified compound II-8 and C. I. Acid Red 289.

Cyan ink: Direct Blue 199

Yellow ink: Direct Yellow 132

When a dye-based black ink is added to the ink set, a preferable ink contains C. I Food Black 2, Exemplified compound 23 and Exemplified compound 28 as the coloring material.

Another ink set according to the present invention comprises a first color ink and a second color ink, both having the same color tone, where the absorbance of the first color ink at the maximum absorption wavelength in the visible light range is higher than that of the second color ink. The second color ink is preferably such that when a 100% solid part is printed on a recording medium (for example, normal paper) with the second color ink, the printed part is visible. For example, the second color ink has an absorbance at the maximum absorption wavelength in the visible light range being 1/20 or more and less than 1 of an absorbance of the first color ink at the masimum absorption wavelength in the visible light range. More specifically, when the above described coloring materials are used, it is preferable for the first ink to contain the coloring material in an amount more than 2 weight % of the total ink weight, thus, the second ink contains the coloring material in an mount of 2 weight % or less to the total ink weight to satisfy the above described conditions.

In addition, it is preferable that the light fastness of the image formed with the second color ink is the same or higher than that with the first ink. When the ink set contains the first and second magenta inks, it is preferable that the second magenta ink contains a coloring material of the general formula (I) as described above as the only coloring material. When the ink set contains the first and second cyan inks, it is preferable that the second cyan ink contains Direct Blue 199 as the only coloring material.

In addition, preferable ink sets according to the present invention are those comprised of the color inks that can give a respective image of which ΔE after the light fastness test is 20 or lower and more preferably, 15 or lower.

Aqueous Medium for Color Ink

The color inks of the ink set of the present invention are prepared by dissolving or dispersing the above described coloring material in an aqueous medium. The aqueous medium comprises water and/or a water-soluble organic solvent.

Any organic solvents can be used so long as they are water-soluble, such as alcohol, polyhydric alcohol, polyglycol, glycol ether, nitrogen-containing polar solvent and sulfur-containing polar solvent. These solvents are used for keeping moisture of the ink, improving solubility of the coloring material, and penetrating the ink into the recording medium.

The content of the water-soluble organic solvent is preferably in the range of 1-40%, more preferably 3-30% by weight of the ink, in consideration of moisture maintenance of the ink, solubility of the coloring materials and penetrability of the ink into recording paper. Preferably, the ink contains water in the range of 30-95% by weight in order to maintain high solubility of the dyes, and to give suitable viscosity to the ink for steady ink ejection.

Additives

In order to maintain the ink moisture, a solid moisturizer such as urea, urea derivatives and trimethylolpropane may be used as an ink component in the present invention, depending on the situation. Generally, the content of the moisturizer in the ink is preferably in the range of 0.1 to 20.0% by weight, more preferably in the range of 3.0 to 10.0% by weight of the ink. In addition, the ink may contain various additives such as pH adjustors, anti-corrosive agents, preservatives, mildewproofing agents, antioxidants, antireductants, evaporation accelerators, chelators and water-soluble polymers, if needed.

As described above, at least one of the color inks constituting the ink set of the present invention contains at least one of a coloring material and an agent that destabilize the dispersion stability of the coloring pigment in the black ink. An embodiment of such a color ink is a color ink containing a salt of a polyvalent metal cation.

Here, the higher the concentration of the polyvalent metal salt in the color ink becomes, the higher the effect of destabilizing the pigment dispersion in the black ink. However, when the concentration of the polyvalent metal salt in the color ink is increased, for example, to 2% by weight or higher, the stability of the color ink is liable to decrease slightly.

In consideration of this point, the present inventors found that addition of 2—pyrrolidone and ethylene urea in the ink is preferable. Although addition of one 2—pyrrolidone or ethylene urea can stabilize a color ink containing a polyvalent metal salt in a high concentration, when 2—pyrrolidone and ethylene urea are used together, even addition of a small amount can exert stabilization effect to an ink containing a high concentration polyvalent metal salt.

Needless to say, 2—pyrrolidone and ethylene urea can be added to the color ink when the concentration of the polyvalent metal salt does not exceeds 2% by weight.

pH

When a coloring material of which water solubility decreases at low pH is used in a color ink for the present invention, it is preferable to maintain the ink pH neutral to alkaline, to prevent clogging in the nozzle tip or for long shelf-life of the ink. On the other hand, when the pH of the ink exceeds 11.0, dissolution and corrosion of a member of the recording means contacting the ink may occur. From these points, when coloring material of which water solubility decreases in a lower pH range, it is preferable to make the ink pH from 7.0 to 11.0.

Also it is preferable that the ink has a Ka value of, for example, 5 mL·m$^{-2}$·msec$^{-1/2}$ or higher and lower than 10 mL·m$^{-2}$·msec$^{-1/2}$, to form a high quality color image on the recording medium. Since inks having such a Ka value are highly penetrating into the recording medium, bleeding between adjacent images can be inhibited when two adjacent images of different colors selected from cyan, magenta and yellow are formed. Further, when a color ink is ejected on an image of another color, bleeding between different color images can be alleviated due to the high penetrability of the inks. Ka value of the color ink can be adjusted by a known method, for example, by adding a surfactant or by adding a penetrating solvent such as glycol ether. Needless to say, the addition amount may be properly adjusted.

Further advantage of the ink set of the present invention is an improved fixation of black image. By applying a black ink containing a dispersed pigment and a color ink containing at least one of a coloring material and an additive that can destabilize the dispersion state of the black ink pigment to a region where a black image is formed, the fixation of the black image to the recording medium is enhanced by overlapping these inks on the recording medium. Here, overlapping the black and color inks includes mixing of these inks in the liquid state by applying the color ink immediately after the black ink, or by applying the black ink immediately after the color ink. However, overlapping the black and color inks is not limited to mixing in the liquid state. Even when one of the inks is applied after the other ink has penetrated into the recording medium, we look on it as mixing so long as the dispersion stability of the pigment in the black ink is broken by the action of the coloring material or additive in the color ink.

With the ink set of the present invention containing a first ink and a second ink both having the same color tone where the first ink has a larger absorbance at the maximum absorption wavelength in the visible region (e.g., 380-780 nm) than that of the second ink, it is preferable the second ink serves to destabilize the dispersion stability of the black ink pigment, in order to prevent or suppress the color tone change of the black image.

When the dispersion of the black pigment is destabilized by a color ink having a high absorbance at the maximum absorption wavelength in the visible light region, for example, an ink containing a coloring material as described above at a concentration of 2% by weight or more of the ink weight, the color tone of the black image may change. Thus, it is important to prevent or suppress such a color tone change in view of further enhancement of the image quality. For this purpose, two or more color inks are applied to the black image region with the black ink. For example, when the ink set comprises black, magenta, cyan and yellow inks and the cyan ink serves to destabilize the black pigment dispersion, in addition to the cyan ink droplet, magenta and yellow ink droplets are applied to the black image region in a predetermined proportion, which improves the black image fixation without or with a little if any, change of black color tone.

Recording Apparatus, Ink Jet Recording Method

The recording apparatus suitable for recording with an ink set according to the present invention include, for example, an apparatus which forms and ejects an ink droplet by applying thermal energy to the ink in accordance with recording signals. A configuration example of the main part, head, of this apparatus is shown in FIGS. 1 and 2.

Figure 2:
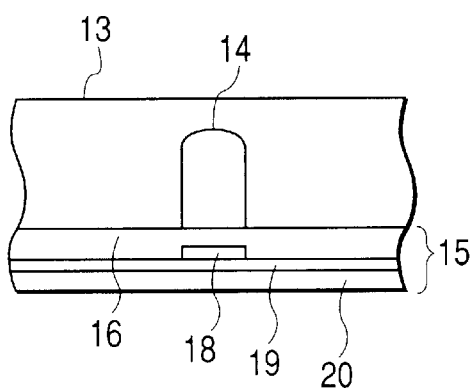
FIG. 2 is a sectional view along 2—2 of the FIG.

FIG. 1 is a sectional view of a head 13 along the ink flow path and FIG. 2 is a sectional view taken on line 2-2 of FIG. 1. The head 13 is obtained by adhesion of a heat generating substrate to a glass, ceramic or plastic plate having a groove 14 through which ink flows. The heat generating substrate 15 comprises a protective film 16 formed of silicon oxide or the like, aluminum electrodes 17-1 and 17-2, a heat generating resistance layer 18 formed of Nichrome, a heat accumulating layer 19 and a highly heat-radiating substrate 20 made of alumina or the like.

When electric signals are applied in pulse to the electrodes 17-1 and 17-2, the region "n" of the heat generating substrate 15 generates heat rapidly, a bubble is formed in the ink contacting the region. The ink 21 comes to a discharge orifice 22 and forms a meniscus 23 under the pressure P due to the bubble formation.

Figure 3:
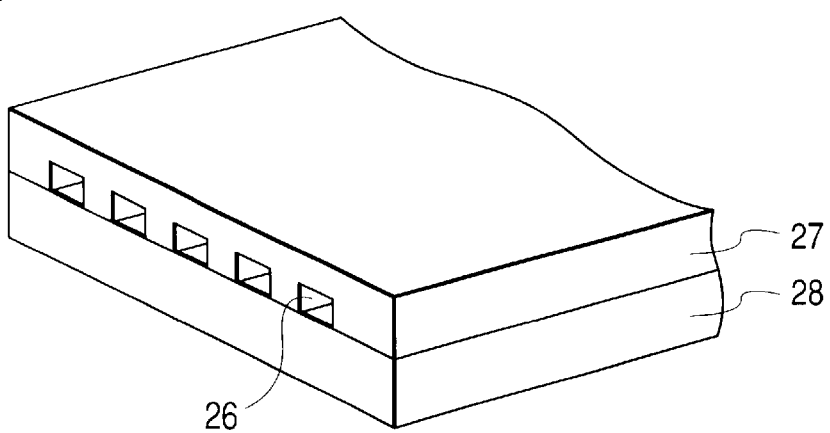
FIG. 3 is a schematic explanatory view of a multihead.

FIG. 3 shows an outside view of a multihead where a plurality of heads shown in FIG. 1 are arrnaged. This multihead is prepared by attaching a glass plate 27 having amultinozzle 26 and a heat-generating head 28 similar to one explained in FIG. 1.

Figure 4:
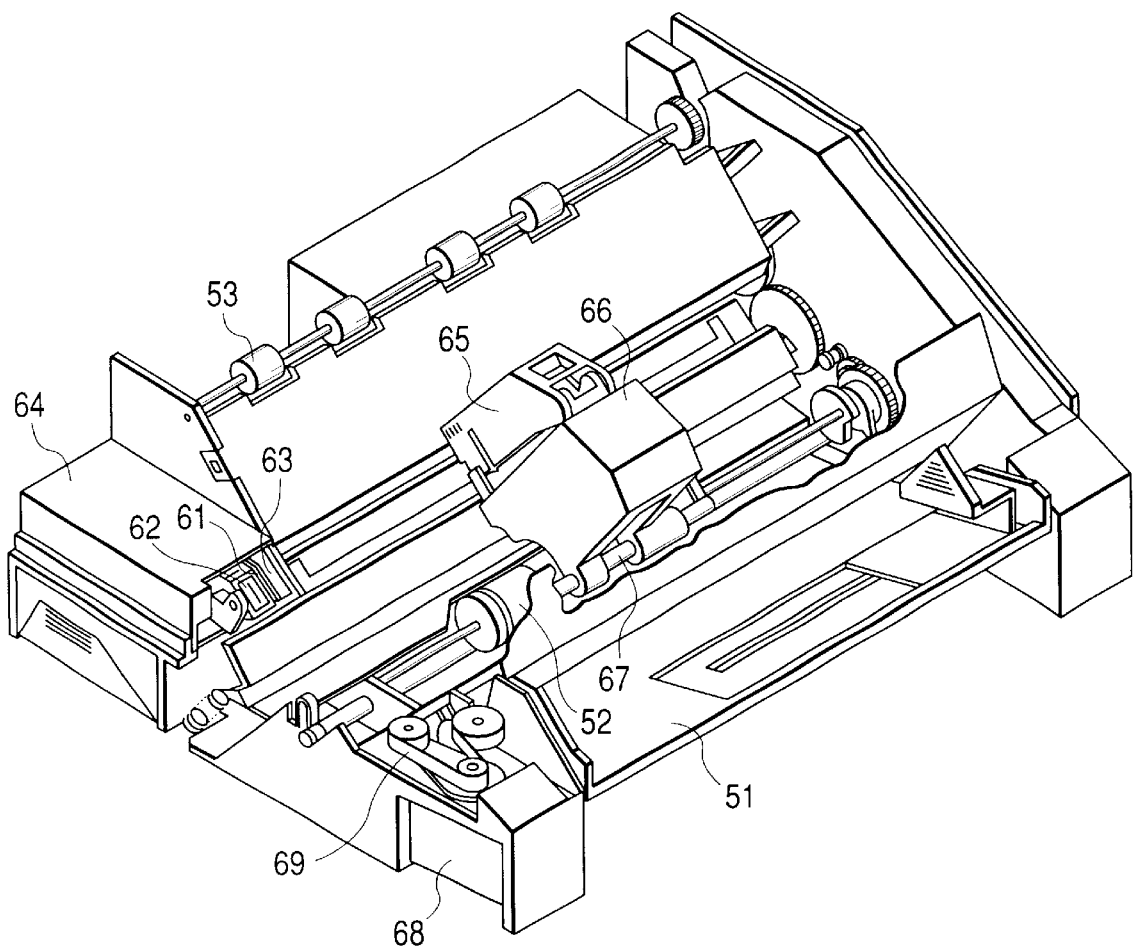
FIG. 4 is a perspective view of an ink jet recording apparatus.

FIG. 4 shows one example of ink-jet recording apparatus with the above head incorporated. In FIG. 4, numeral 61 denotes a blade serving as the wiping member, one end of which is retained by a blade retaining member to make a stationary end, thereby shaping a cantilever as a whole. The blade 61 is disposed at a position adjacent to the recording area by the recording head and is retained in the shape of protruding into the moving route of the recording head in case of this example.

Numeral 62 denotes a cap on the ejection orifice surface of the recording head, which is located at the home position adjacent to the blade 61 and so arranged as to move in a direction perpendicular to the movement of the recording head, to butt against the ink ejection orifice and to fulfill the capping. Furthermore, Numeral 63 denotes an ink absorber provided adjacently to the blade 61, which is retained in the shape of protruding into the moving route of the recording head as with the blade 61. A discharge recovering section 64 comprises the above blade 61, the above cap 62 and the above ink absorber 63 and the moisture, dust and the like on the ink ejection orifice are removed by the blade 61 and the ink absorber 63.

Numerals 65 and 66 denotes a recording head equipped with discharge energy generating means which discharges ink to the recording medium opposed to the ejection orifice face from a ejection orifice disposed to perform recording and an carriage for loading and moving the recording head 65, respectively. The carriage 66 is slidably engaged with a guide shaft 67 and part of the carriage 66 is connected (unillustrated) to the belt 69 driven by a motor 68. Thereby, the carriage 66 is enabled to move along the guide shaft 67, thus enabling the recording area by the recording head 65 and its adjacent areas to move. Numerals 51 and 52 denote a paper feed section for inserting a recording medium and a paper feed roller driven by an unillustrated motor, respectively.

By these constituents, the recording medium is fed to the position opposed to the ejection orifice face of the recording head 65 and paper is discharged to the paper discharge section disposed with the paper discharge roller 53 according to the progress of recording. In a return of the recording head 65 to the home position at the end of recording or the like with the above configuration, the cap 62 of the discharge recovering section 64 is averted from the moving route of the recording head 65, whereas the blade 61 protrudes into the moving route. As a result, the ejection orifice face of the recording head 65 is wiped. When the cap 62 caps the ejection orifice face of the recording head 65 by butting, the cap 62 moves in such a manner as to protrude into the moving route of the recording head. When the recording head 65 moves from the home position to the recording start position, the cap 62 and the blade 61 stand at the same position as that of the above wiping. As a result, the ejection orifice face of the recording head 65 is wiped also in this move.

The above move of the recording head 65 to the home position is not only performed at the completion of recording and at the recovery of discharge, but also the recording head 65 moves at given intervals to the home position adjacent to the recording area while moving through the recording area for recording and the above wiping is carried out with this move.

Figure 5:
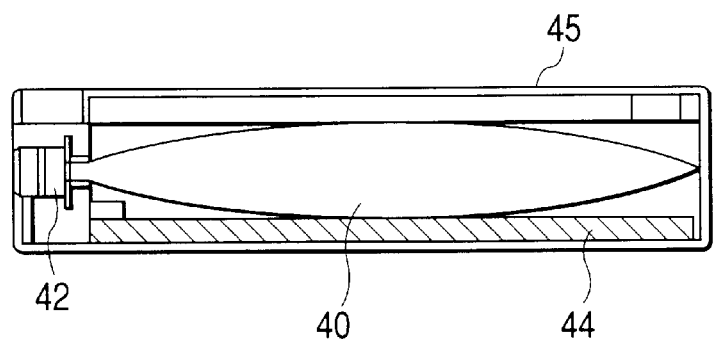
FIG. 5 is a longitudinal section of an ink cartridge.

FIG. 5 shows one example of an ink supply member for the head, an ink cartridge 45 for storing the ink supplied via a tube. Here, numeral 40 denotes an ink storing section for storing the supply ink, e.g. an ink bag, at the tip of which a rubber stopper 42 is provided. By inserting a needle (unillustrated) into this stopper 42, the ink in the ink sack 40 is enabled to be supplied to the head. Numeral 44 denotes an ink absorber for receiving the waste ink. Preferably, the surface of the ink storing section in contact with the ink is made of polyolefin, especially, made of polyethylene.

Figure 6:
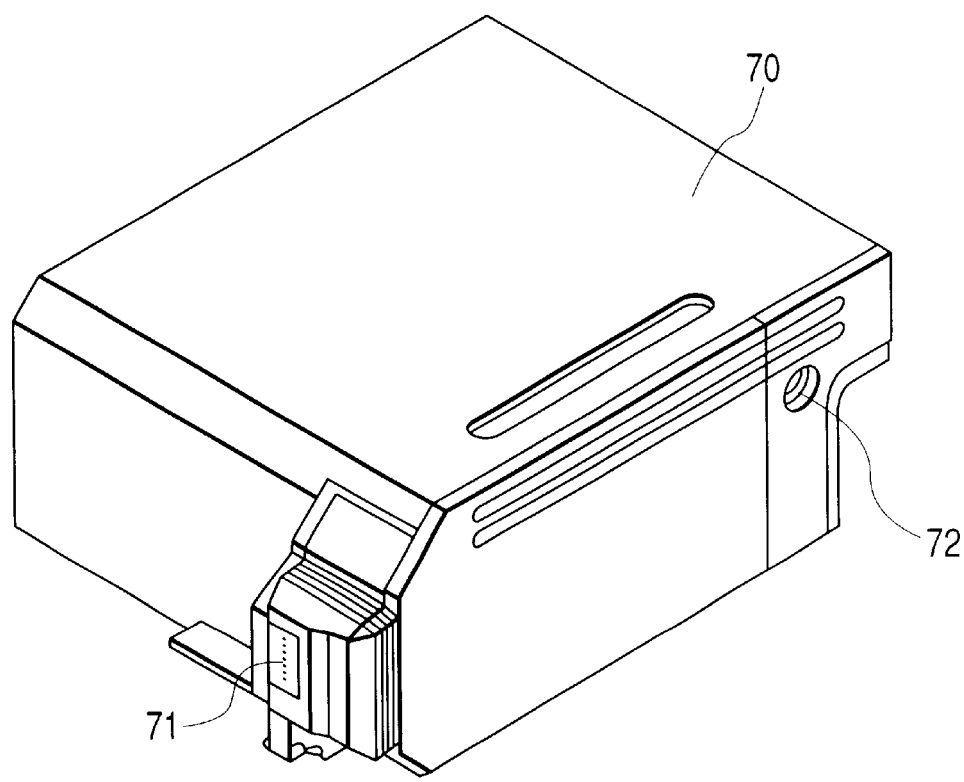
FIG. 6 is a perspective view of a recording unit.

An ink-jet recording apparatus according to the present invention is not limited to those comprising a head and an ink cartridge separately as mentioned above, but is also appropriately applied to integrated one as shown in FIG. 6. In FIG. 6, numeral 70 denotes a recording unit in which an ink store section for storing ink, e.g. an ink absorber is accommodated and the ink in such an ink absorber is discharged as an ink droplet from the head section 71 having a plurality of orifices. Numeral 72 denotes an atmosphere communicative port for communicating the recording unit interior to the atmosphere. This recording unit 70 is used in place of the recording head 65 shown in FIG. 4 and is freely mountable and demountable.

Another example of an ink-jet recording apparatus making good use of mechanical energy, may be mentioned an On-Demand type ink-jet recording apparatus comprising a nozzle-forming substrate having a plurality of nozzles, pressure-generating devices composed of a piezoelectric material and an electric conductive material provided in an opposing relation to the nozzles, and an ink filled around the pressure-generating devices, wherein the pressure-generating devices are changed by voltage applied to eject droplets of the ink from the nozzles.

Figure 23:
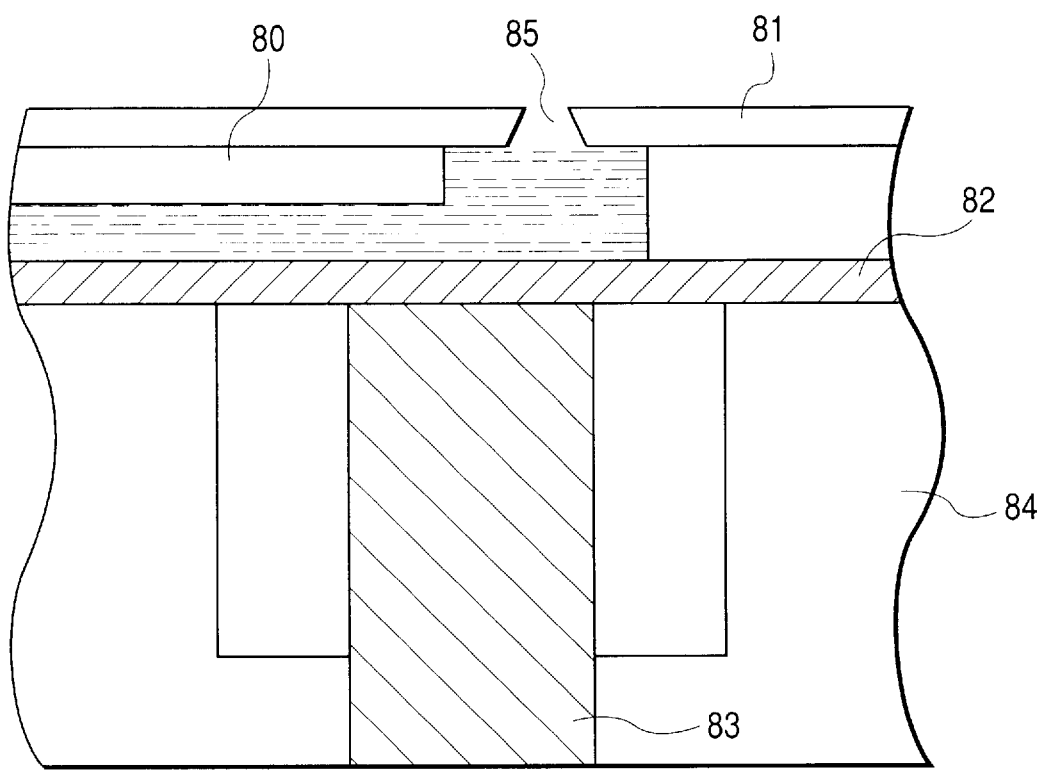
FIG. 23 is a schematic view showing another configuration of an ink jet recording head.

An example of the construction of a recording head, which is a main component of such a recording apparatus, is illustrated in FIG. 23.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing a change according to an electric signal, and a substrate 84 adapted to support and fix the orifice plate 81, the vibration plate 82 and the like thereon.

In FIG. 23, the ink flow path 80 is formed with a photosensitive resin or the like. The orifice plate 81 is made of a metal such as stainless steel or nickel, and an ejection opening 85 of which is formed by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or $PZT(Pb[ZrTi]O_2)$.

The recording head with the above construction is operated in such a manner that pulsed voltage is applied to the piezoelectric element 83 to generate a stress to cause strain, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording.

Such a recording head is used by incorporating it into an ink-jet recording apparatus similar to that illustrated in FIG. 4.

Next, another particular example of a recording apparatus and a recording head that can suitably be used in the present invention will be described.

Figure 7:
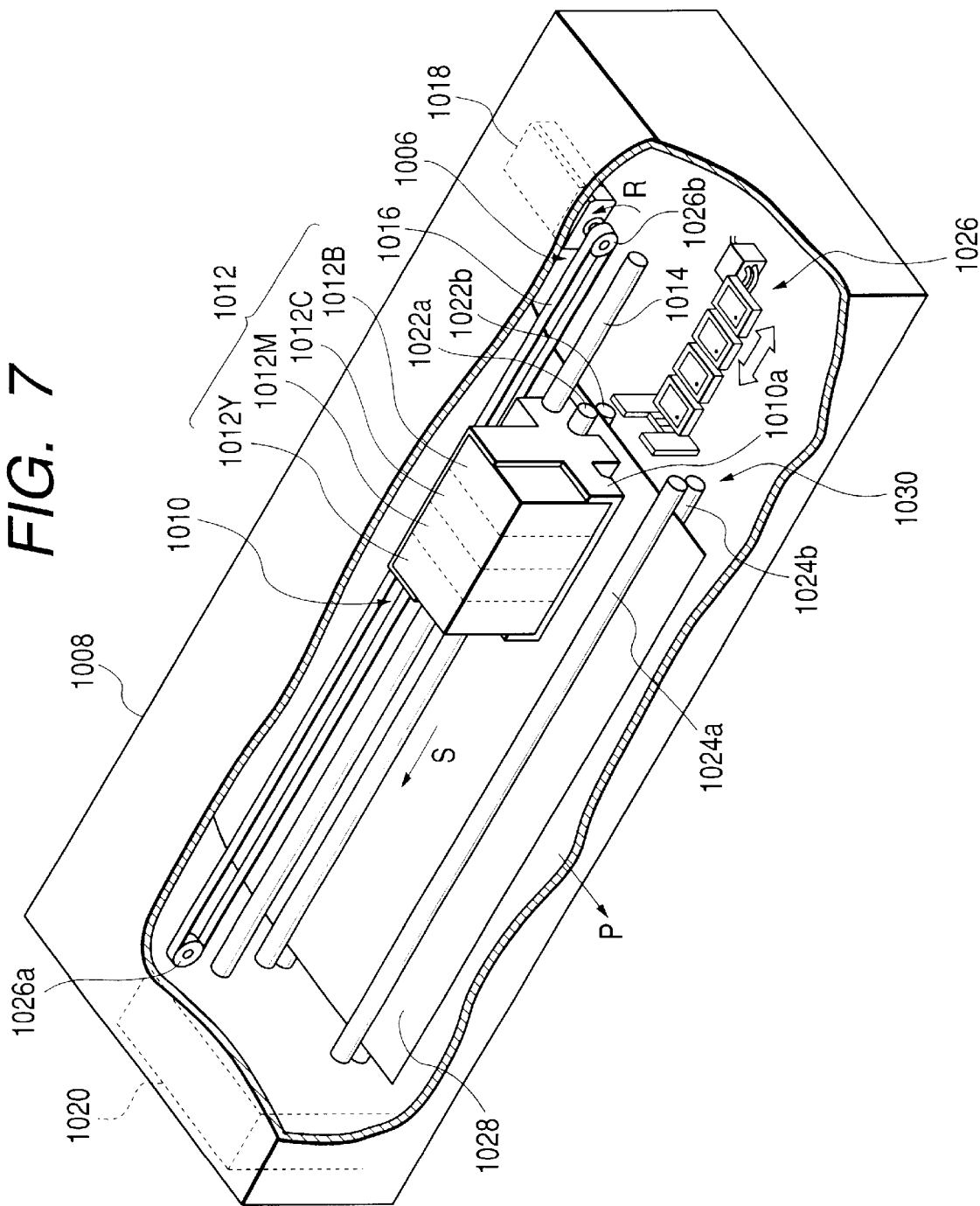
FIG. 7 is a schematic perspective of the main part of an ink jet printer capable of mounting a liquid ejection head thereon.

FIG. 7 schematically shows the main section of one example of a liquid ejection head as an ejection type liquid ejection head in which the bubble communicates with the atmosphere at the time of discharge and an ink jet printer as a liquid discharge apparatus using this head according to the present invention. In FIG. 7, the ink jet printer is configured to comprise a feeder device 1030 that intermittently feeds a sheet of paper 1028 as a recording medium provided along the longitudinal direction in a casing 1008 in the direction shown by arrow P shown in FIG. 7, a recording section 1010 that is reciprocated approximately in parallel to the direction S approximately at right angles to the feeding direction P of the paper 1028 by the feeder device 1030, and a movement driving section 1006 as driving means for reciprocating the recording section 1010.

The feeder device 1030 comprises a roller unit 1022*a* and 1022*b* and a roller unit 1024*a* and 1024*b* are allocated approximately in parallel, and a driving portion 1020 for driving these roller units. With such a constitution, when the driving portion 1020 of the feeder device 1030 is operated, the paper 1028 is conveyed intermittently in the direction P as shown in FIG. 7, nipped between the roller units 1022*a* and 1022*b*, and 1024*a* and 1024*b*.

The movement driving section 1006 comprises a belt 1016 that is wound on pulleys 1026*a*, 1026*b* provided on rotary shafts oppositely arranged with a predetermined interval, and a motor 1018 that drives the belt 1016 arranged approximately in parallel to roller units 1022*a*, 1022*b* and connected to a carriage member 1010*a* of the recording section 1010 in the forward direction and reverse direction.

When the motor 1018 is brought in the operating state and the belt 1016 is rotated in the direction shown by arrow R in FIG. 7, the carriage member 1010*a* of the recording section 1010 is moved in the direction shown by arrow S in FIG. 7 only by a predetermined movement. Furthermore, when the motor 1018 is brought in the operating state and the belt 1016 is rotated in the direction opposite to the direction shown by arrow R in FIG. 7, the carriage member 1010*a* of the recording section 1010 is moved in the direction opposite to the direction shown by arrow S in FIG. 7 only by a predetermined movement. Furthermore, to one end of the movement driving section 1006, at a position which is a home position of the carriage member 1010*a*, a recovery unit 1026 for performing the ejection recovery process of the recording section 1010 is provided opposite to the arrangement of the ink ejection orifice of the recording section 1010.

In the recording section 1010, ink jet cartridges (hereafter, in some cases, referred to simply as cartridges) 1012Y, 1012M, 1012C, 1012B are detachably provided to the carriage member 1010*a* for each color, for example, for each of yellow, magenta, cyanogen, and black.

Figure 8:
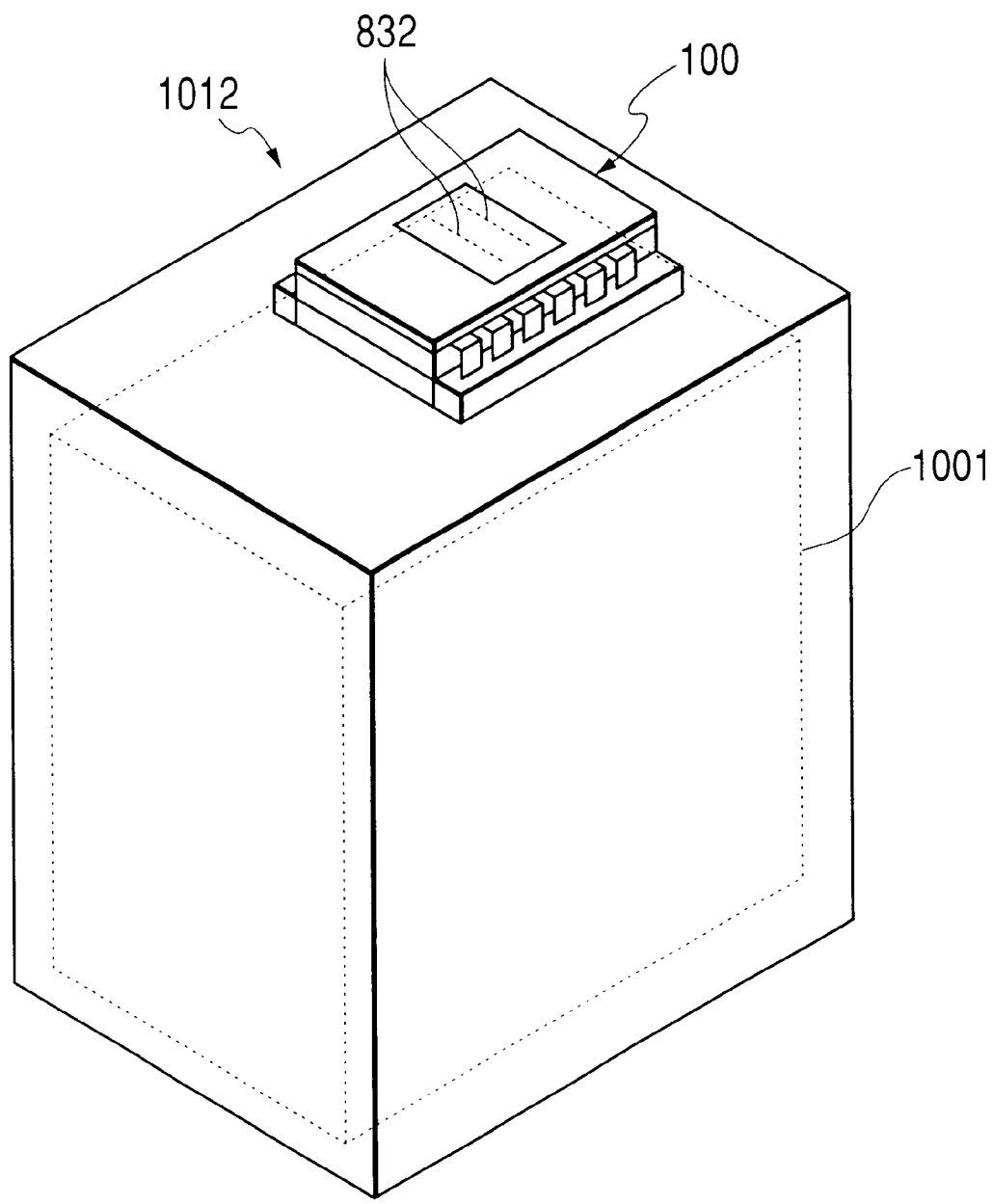
FIG. 8 is a schematic perspective view of an ink jet cartridge with an ejection head.

FIG. 8 shows one example of an ink jet cartridge that can be mounted on the above described ink jet recording apparatus. The cartridge 1012 in this example is a serial type cartridge, and the main section consists of an ink jet recording head 100 and a liquid tank 1001 for containing liquid such as ink. In the ink jet recording head 100, a number of ejection orifices 832 for discharging the liquid are formed, and the liquid such as ink is arranged to be introduced to a common liquid chamber (see FIG. 9) of the liquid ejection head 1100 through a liquid supply path not shown from a liquid tank 1001. The cartridge 1012 shown in FIG. 8 is a cartridge in which the ink jet recording head 100 and the liquid tank 1001 are integrally formed so that liquid may be supplied into the liquid tank 1001 if necessary, but it is also possible to adopt a structure where the liquid tank 1001 is exchangeably connected to this liquid ejection head 1100.

A particular example of the above described liquid ejection head that can be mounted on an ink jet printer with such a configuration will be described below in more detail.

Figure 9:
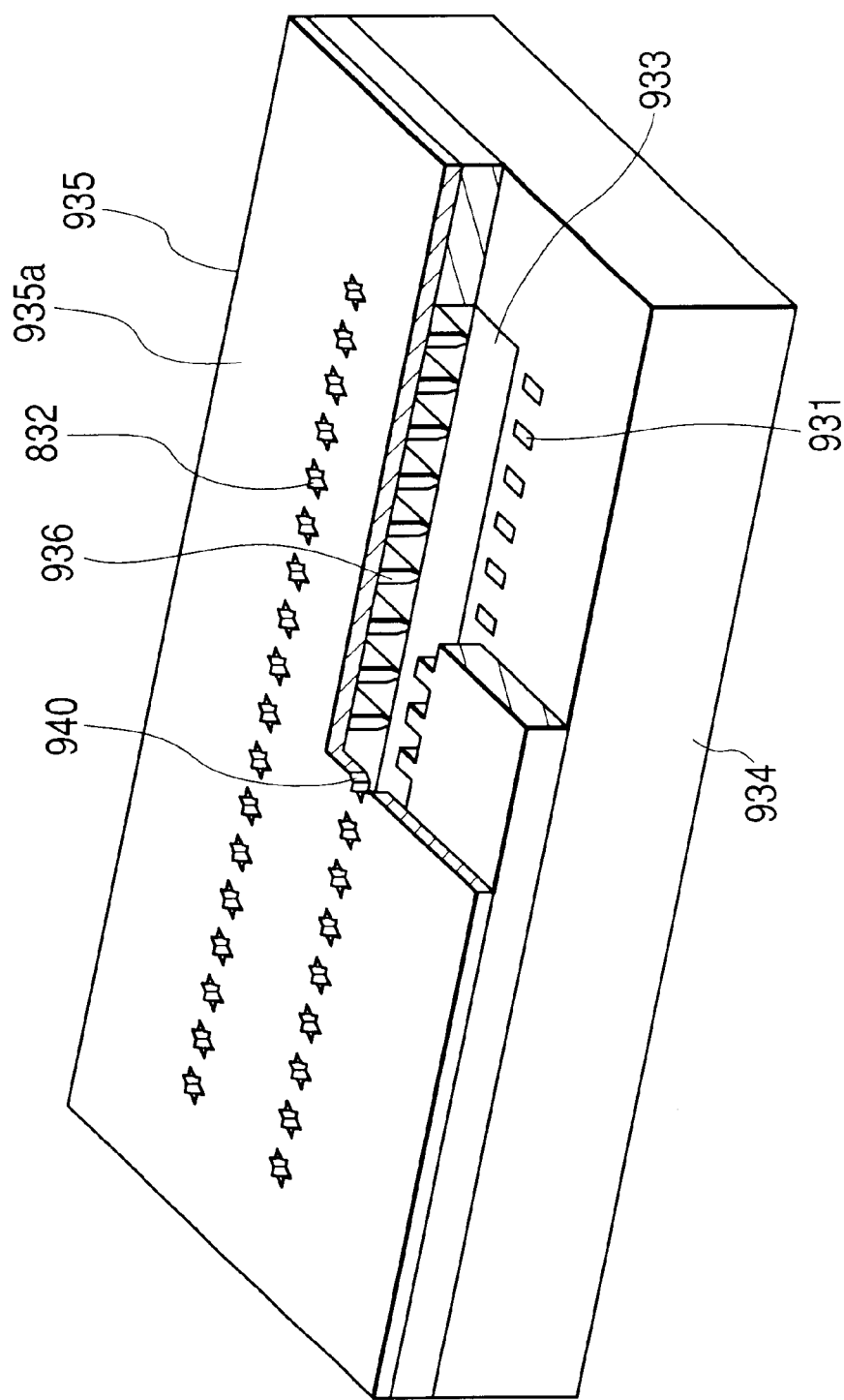
FIG. 9 is a schematic view of the main part of an ejection head.

FIG. 9 is a perspective view schematically showing the main section of a liquid ejection head showing the basic form of the present invention, and FIG. 10 to FIG. 13 are front views showing the shape of the ejection orifice of a liquid ejection head shown in FIG. 9. Herein, the electrical wiring or the like for driving the electrothermal converting element is omitted.

In the liquid ejection head of this example, for example, as shown in FIG. 9, a substrate 934 made of glass, ceramics, plastic, or metal or the like is used. The material of such a substrate is not important for the present invention, and it is not specifically limited as long as it can function as part of the flow path component and it can function as a support member of the material layer forming the ink ejection energy generating element, and the liquid flow path and ejection orifice to be described later. Accordingly, in this example, a case where an Si substrate (wafer) is used will be described. Besides a forming method by using laser beams, the ejection orifice can also be formed by a method in which for example, an orifice plate (ejection orifice plate) 935 to be described later is made of photosensitive plastics so that an exposure device such as MPA (Mirror Projection Aliner) may be used.

In FIG. 9, reference numeral 934 denotes a substrate having an electrothermal converting element (hereafter, in some cases, referred to as a heater) 931 and an ink supply port 933 made of an elongated groove-shaped through hole as a common liquid chamber section, and on both sides in the longitudinal direction of the ink supply port 933, one line of heaters 931 that are thermal energy generating means are arranged in a staggered arrangement, for example, at intervals of 300 dpi between the electrothermal converting elements, respectively. On this substrate 934, ink flow path walls 936 for forming ink flow paths are provided. Furthermore, to these ink flow path walls 936, an ejection orifice plate 935 having ejection orifices 832 is provided.

Here, in FIG. 9, the ink flow path wall 936 and the ejection orifice plate 935 are shown as separate members, but it is also possible to simultaneously form the ink flow path wall 936 and the ejection orifice plate 935 as one member by forming this ink flow path wall 936 on the substrate 934 by a method such as the spin coating. In this example, furthermore, the water repellency treatment is performed on the ejection orifice surface (upper surface) 935a side.

In this example, a serial type head that performs recording while scanning in the direction shown by arrow S in FIG. 7 is used, and the recording is performed, for example, by 1200 dpi. The driving frequency is 10 kHz, and at one ejection orifice, the discharge is performed at the shortest time intervals of 100 $\mu$s.

Figure 10:
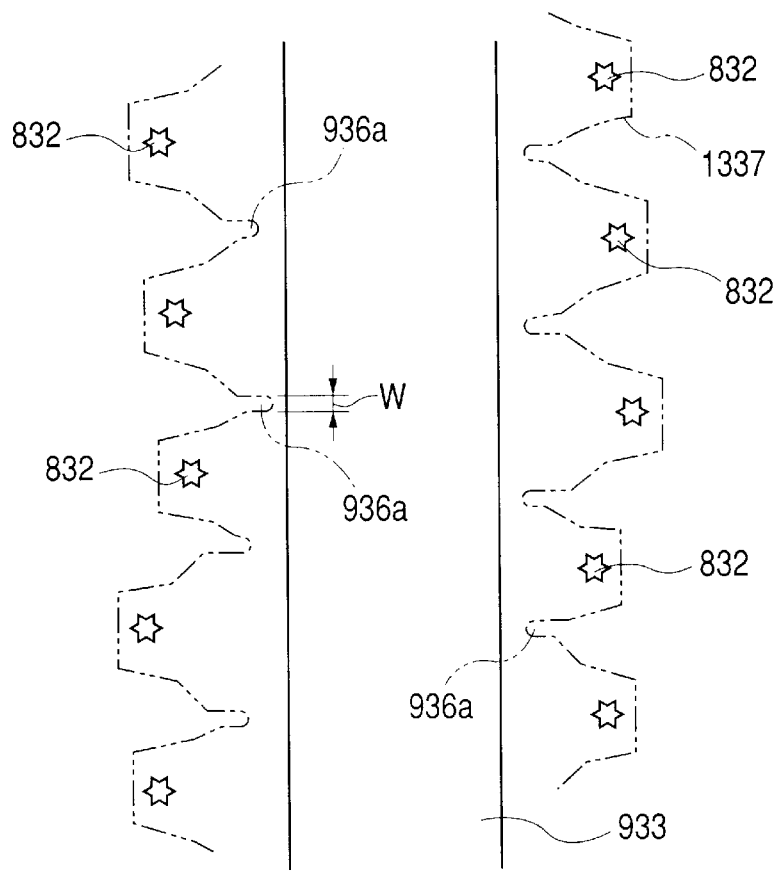
FIG. 10 is a conceptional view of a part of an ejection head.
Figure 13:
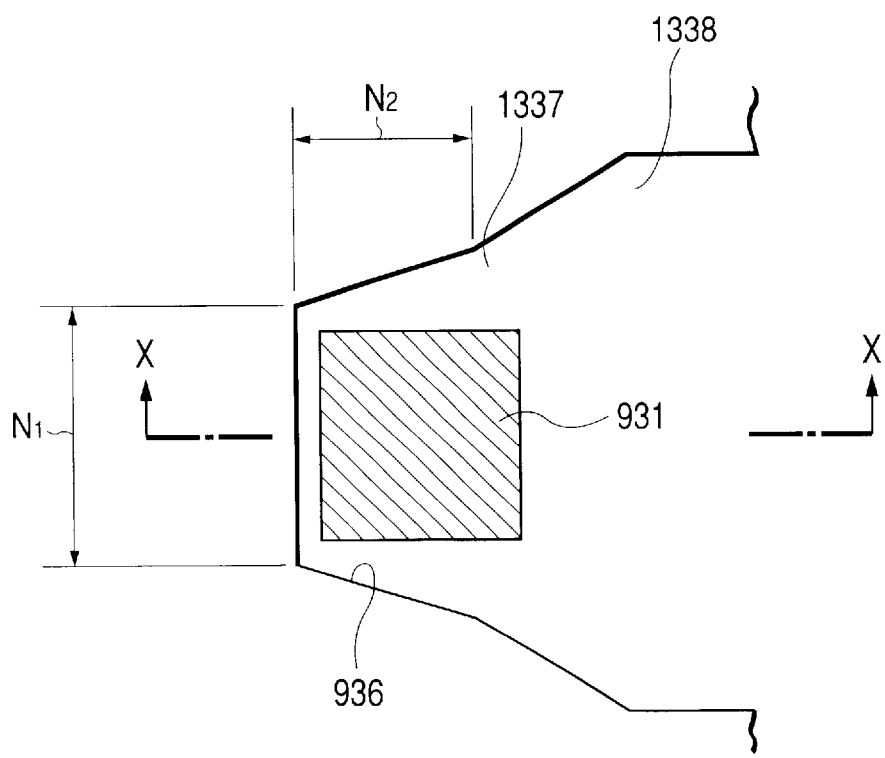
FIG. 13 is a schematic view of the main part of the liquid ejection head shown in FIG. 10.

Furthermore, as one example of actual size of the head, for example, as shown in FIG. 10, a partition wall 936a that hydraulically separates adjacent nozzles has a width W of 14 $\mu$m. As shown in FIG. 13, a bubbling chamber 1337 formed by the ink flow path wall 936 has $N_1$ (width size of a bubbling chamber) of 33 $\mu$m and $N_2$ (length size of a bubbling chamber) of 35 $\mu$m. The size of a heater 931 is 30 $\mu$m×30 $\mu$m, and the resistance of a heater is 53 $\omega$, and the driving voltage is 10.3 V. Furthermore, the height of an ink flow path wall 936 and a partition wall 936a is 12 $\mu$m, and an ejection orifice plate with a thickness of 11 $\mu$m can be used.

Figure 11:
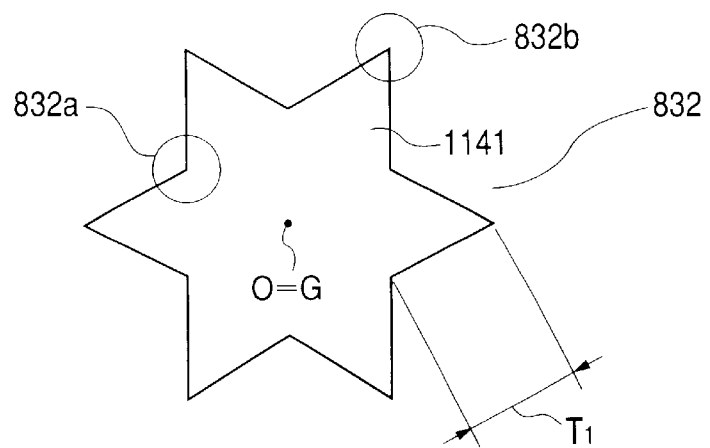
FIG. 11 is an enlarged view of the ejection port shown in FIG. 10.

Among the cross sections of the ejection orifice section 940 shown in FIG. 9 provided in the ejection orifice plate including the ejection orifice 832, the cross section taken in the direction crossing the discharge direction of the ink (thickness direction of the orifice plate 935) is shaped roughly like a star as shown in FIG. 11, and it is roughly configured by six rising sections 832a having an obtuse angle and six recessed sections 832b arranged alternately between these rising sections 832a and having an acute angle. That is, six grooves are formed in the thickness direction of the orifice plate of FIG. 9 (discharge direction of the liquid) with the recessed section 832b as an area locally separated from the center O of the ejection orifice being the top thereof and the rising section 832a as an area locally near the center O of the ejection orifice adjacent to this area being the base thereof (see FIG. 11).

In this example, the ejection orifice section 940 is made such that for example, the cross section fallen in the direction crossing the thickness direction thereof has a shape of two equilateral triangles with a side of 27 $\mu$m combined rotated by 60 degrees to each other, and $T_1$ shown in FIG. 11 is 8 $\mu$m. Every angle of the rising section 832a is 120 degrees, and every angle of the recessed section 832b is 60 degrees. Accordingly, it is arranged that the center O of the ejection orifice agrees with the center G of gravity of a polygon formed by connecting central sections (centers (centers of gravity) of the figure formed by connecting the top of the groove and two bases adjacent to this top) of mutually adjacent grooves.

Figure 12:
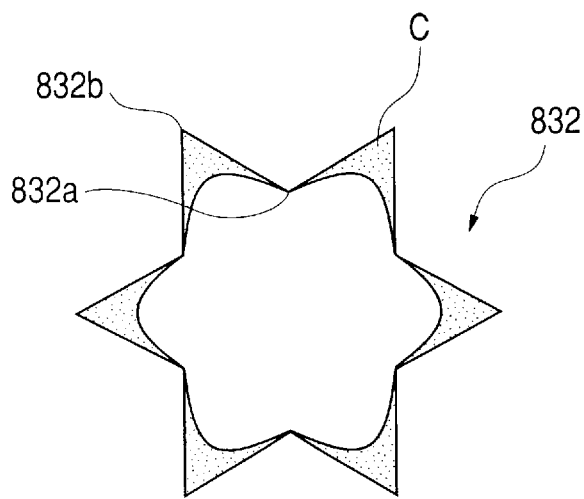
FIG. 12 schematically shows the ink deposition state of the ejection port portion shown in FIG. 11.

The opening area of an ejection orifice 832 of this example is 400 $\mu m^2$, and the opening area of the groove section (area of a figure made by connecting the top of the groove and two bases adjacent to this top) is about 33 $\mu m^2$ per one. FIG. 12 is a schematic view showing the state where ink is applied to the part of the ejection orifice shown in FIG. 11.

Next, the discharging action of liquid by an ink jet recording head with the above described configuration will be described by using FIG. 14 to FIG. 21. FIG. 14 to FIG. 21 are cross sectional views for explaining the liquid discharging action of a liquid ejection head described in FIG. 9 to FIG. 13, and are cross sectional views taken along X-X of a bubbling chamber 1337 shown in FIG. 13. In this cross section, the end in the thickness direction of the orifice plate of the ejection orifice 940 is the top 1141a of the groove 1141.

Figure 14:
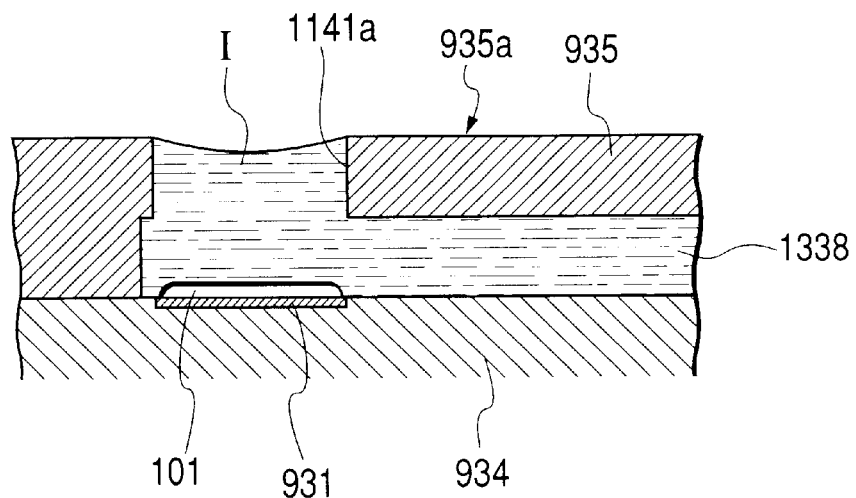
FIGS. 14, 15, 16, 17, 18, 19, 20 and 21 are a schematic sectional view of the liquid ejection head taken along X—X in FIG. 13, illustrating the liquid ejection operation of the liquid ejection head with time.
Figure 15:
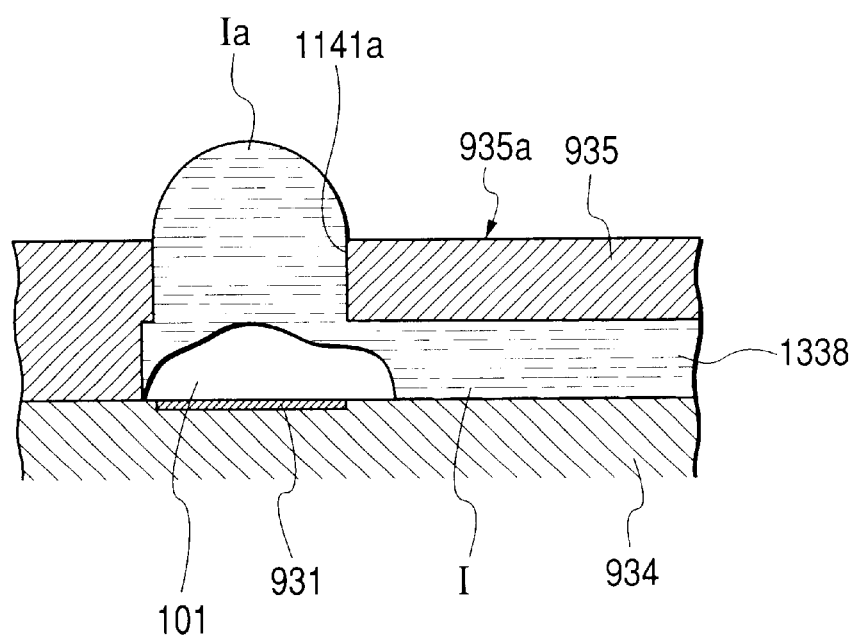
Figure 16:
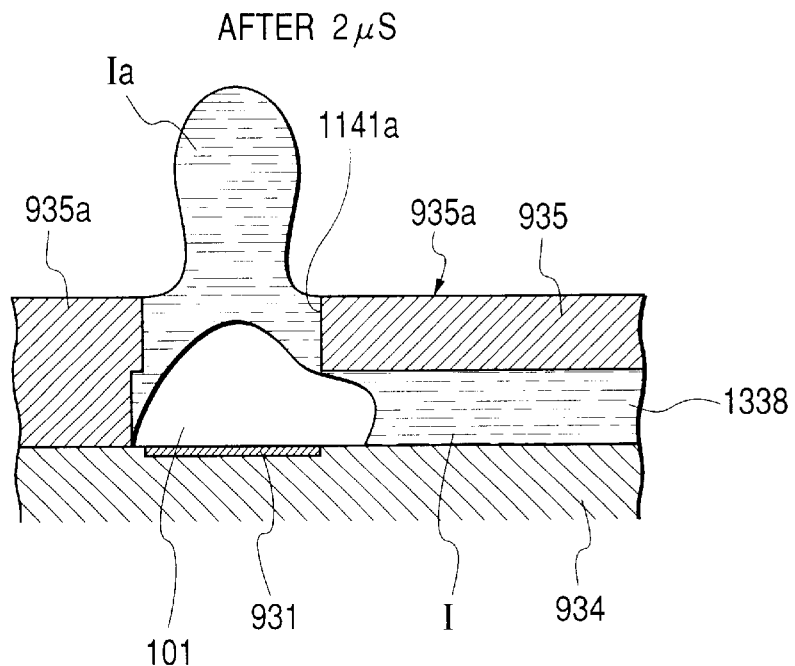
Figure 17:
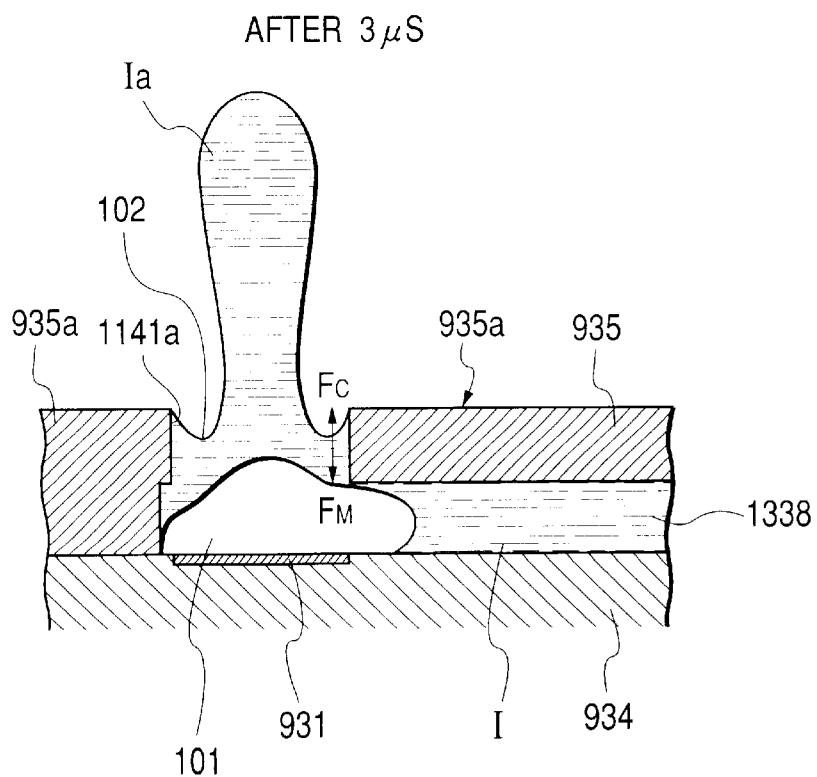
Figure 18:
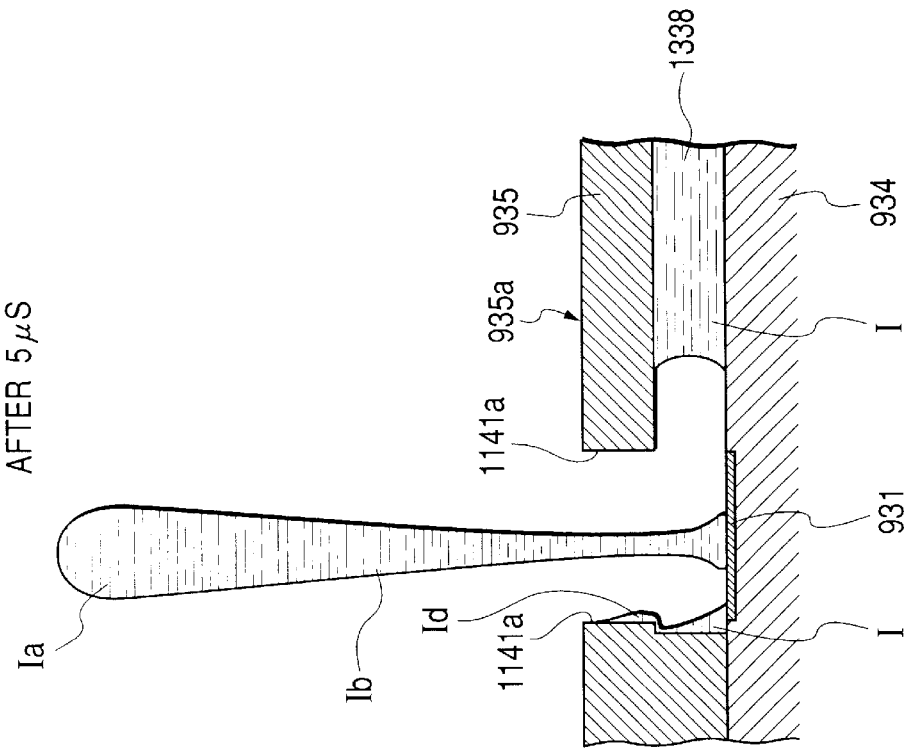
Figure 19:
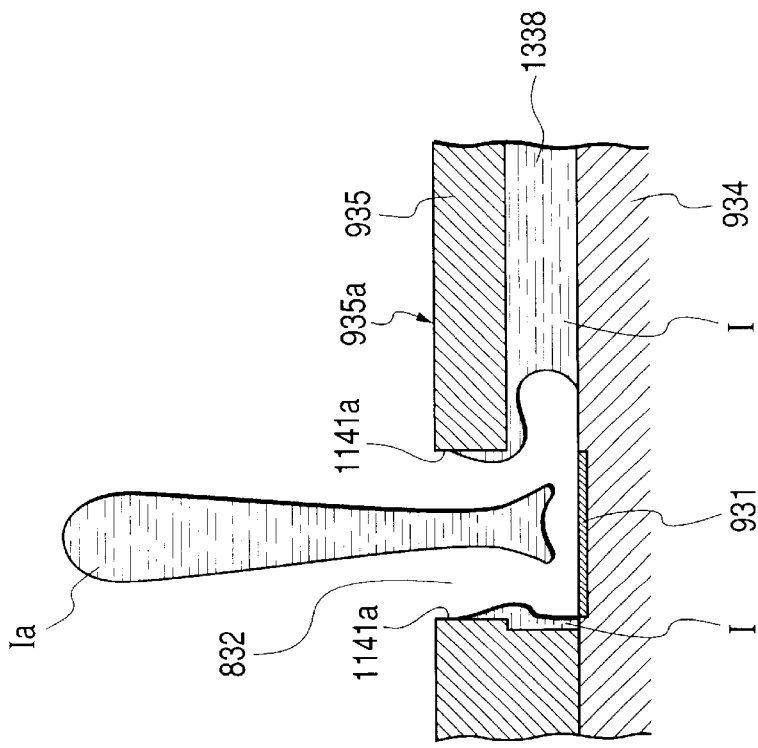
Figure 20:
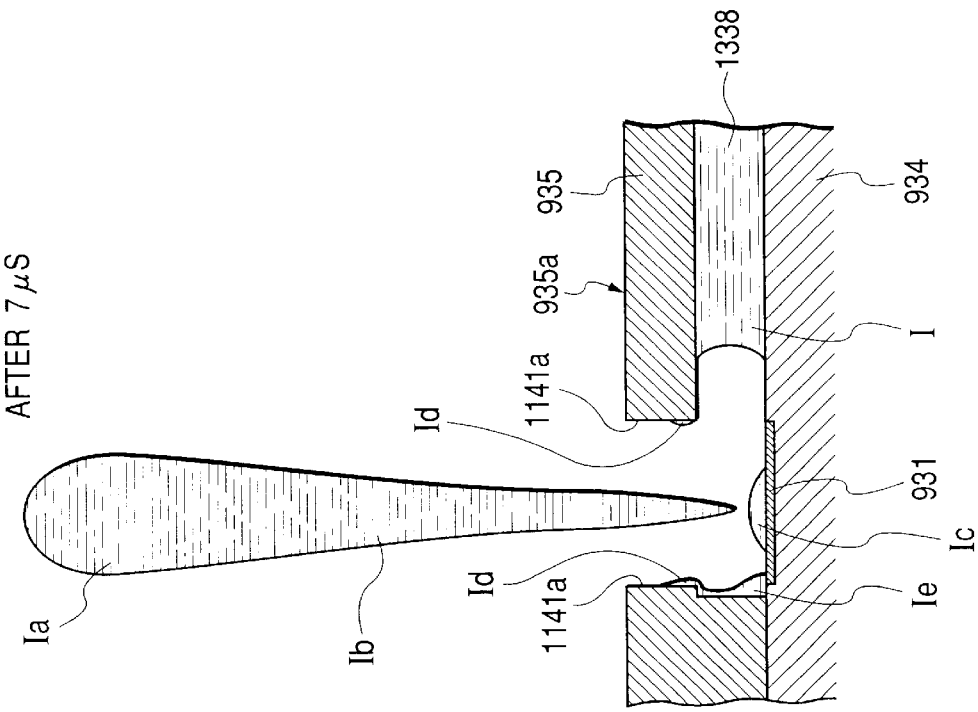
Figure 21:
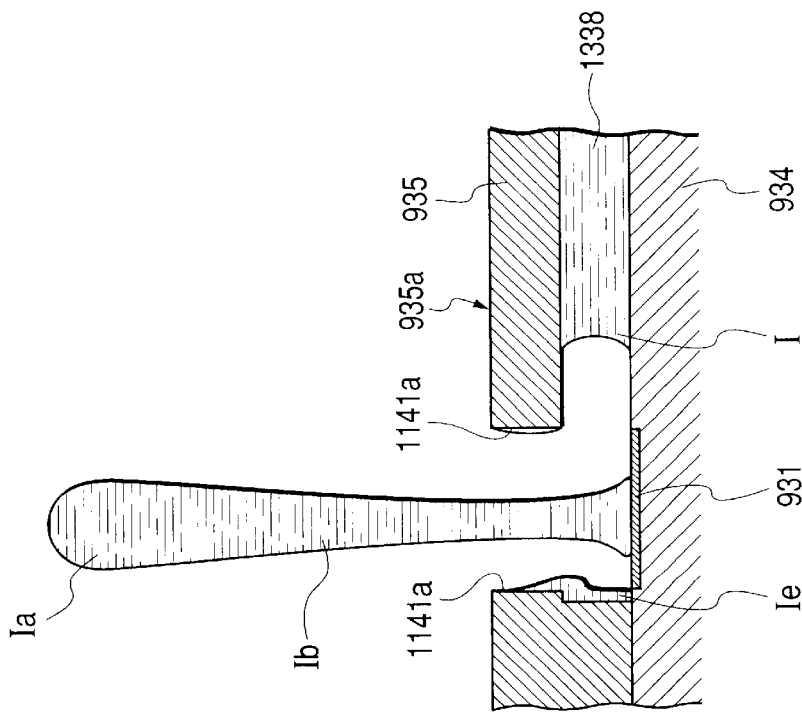

FIG. 14 shows a state where a film-like bubble is formed on the heater, and FIGS. 15 to 21 show the subsequent state of the bubble. FIG. 15 shows a state about 1 $\mu$s after the state of FIG. 14, and FIG. 16 shows a state about 2 ps after the state of FIG. 14, and FIG. 17 shows a state about 3 $\mu$s after the state of FIG. 14, and FIG. 18 shows a state about 4 $\mu$s after the state of FIG. 14, and FIG. 19 shows a state about 5 μs after the state of FIG. 14, and FIG. 20 shows a state about 6 μs after the state of FIG. 14, and FIG. 21 shows a state about 7 μs after the state of FIG. 14. Herein, in the following description, dropping does not mean the falling in the so-called direction toward gravity, but it means the movement in the direction toward an electrothermal converting element regardless of the attaching direction of a head.

First, as shown in FIG. 14, when a bubble 101 is formed in the liquid flow path 1338 on the heater 931 on supplying electric current to the heater 931 according to a recording signal or the like, the volume thereof is suddenly expanded within about 2 μs as shown in FIG. 15 and FIG. 16, so that the bubble may grow. The height of the bubble 101 at the time of the maximum volume exceeds the ejection orifice surface 935a, but at this moment, the pressure of a bubble is decreased to about one half to one-nineteenth of the atmospheric pressure.

Next, at the time about 2 μs after the formation of a bubble 101, the bubble 101 begins to decrease the volume from the maximum volume as mentioned above, and approximately simultaneously with this, the formation of a meniscus 102 also begins. This meniscus 102 also retreats in the direction on the heater 931 side, that is, falls as shown in FIG. 17.

Here, in this example, there are a plurality of grooves 1141 scattered at the ejection orifice section, and therefore, when the meniscus 102 retreats, the capillary force acts in the opposite direction Fc of the meniscus retreating direction FM at the part of the groove 1141. As a result of that, even if a little scattering is recognized in the state of the bubble 101 because of any reason, the shapes of the meniscus when retreating and the main liquid droplet (hereafter, in some cases, referred to as liquid or ink) Ia are modified to be approximately symmetrical shapes with respect to the center of the ejection orifice.

Then, in this example, the falling speed of this meniscus 102 is faster than the contracting speed of the bubble 101, and therefore, as shown in FIG. 18, the bubble 101 communicates with the atmosphere at a place near the under surface of the ejection orifice 832 at the time about 4 μs after the formation of the bubble. At this moment, the liquid (ink) near the central axis of the ejection orifice 832 falls down toward the heater 931. This is caused since the liquid (ink) Ia drawn back to the heater 931 side by the negative pressure of the bubble 101 before communicating with the atmosphere keeps the speed in the direction of the surface of the heater 931 due to the inertia after the bubble 101 has communicated with the atmosphere.

The liquid (ink) that has fallen down toward the heater 931 side reaches the surface of the heater 931 at the time about 5 μs after the formation of the bubble 101 as shown in FIG. 19, and as shown in FIG. 20, it spreads to cover the surface of the heater 931. The liquid that has spread to cover the surface of the heater 931 in this way has a vector in the horizontal direction along the surface of the heater 931, and it crosses the surface of the heater 931. For example, the vector in the vertical direction vanishes, and it tends to stay on the surface of the heater 931, and it pulls down the liquid on the upper side thereof, that is, the liquid keeping the velocity vector in the discharge direction.

After that, the liquid part Ib between the liquid that has spread on the surface of the heater 931 and the liquid on the upper side (main liquid droplet) becomes thin, and as shown in FIG. 21, at the time about 7 μs after the formation of the bubble 101, the liquid part Ib is cut off at the center of the surface of the heater 931, and it is divided into the main liquid droplet Ia keeping the velocity vector in the discharge direction and the liquid Ic that has spread on the surface of the heater 931. Thus, the division preferably occurs in a position in the liquid flow path 1338, and it is more preferable to be positioned on the electrothermal converting element 931 side from the ejection orifice 832.

The main liquid droplet Ia is discharged from the central part of the ejection orifice 832 with no deviation in the discharge direction, and with no discharge twist, and it lands on a predetermined position of the recording surface of the recording medium. Furthermore, the liquid Ic that has spread on the surface of the heater 931 should become a satellite droplet as a follower of the main liquid droplet to fly in the prior art, but it stays on the surface of the heater 931, and it is not discharged.

Thus, the discharge of the satellite droplet can be inhibited, and therefore, the splash that is easily produced by the discharge of the satellite droplet can be prevented, and it is possible to surely prevent the staining of the recording surface of the recording medium because of the mist floating like fog. Herein, in FIG. 18 to FIG. 21, reference numeral Id denotes the ink adhered to the groove section (ink in the groove), and reference numeral Ie denotes the ink remaining in the liquid flow path.

Thus, in the liquid ejection head of this example, when the liquid is discharged at the step of decreasing of the volume after the bubble has grown to have the maximum volume, it is possible to stabilize the direction of the main liquid droplet at the time of discharge, by a plurality of grooves scattered around the ejection orifice. As a result of that, it is possible to provide a liquid ejection head with no twist in the discharge direction and with a high landing accuracy. Furthermore, since the discharge can stably be performed even when the bubbling is scattered at a high driving frequency, the high speed and highly fine printing can be realized.

Especially, at the step of decreasing of the volume of a bubble, this bubble is made to communicate with the atmosphere for the first time so that the liquid may be discharged, and therefore, it is possible to prevent the mist that occurs when the liquid droplet is discharged by making the bubble communicate with the atmosphere, and consequently, it is also possible to inhibit the state where the liquid droplet is adhered on the ejection orifice surface, which causes a so-called sudden ejection stop.

Furthermore, as another embodiment of a discharge type recording head capable of being preferably used for the present invention in which the bubble is made to communicate with the atmosphere at the time of discharge, a so-called edge shooter type can be cited, for example, as described in Japanese Patent Registration No. 2,783,647.

The present invention brings on an excellent effect especially in a recording head and a recording apparatus of the ink jet system in which thermal energy is utilized to form a flying liquid droplet so that recording may be performed, among the ink jet recording systems.

As for the typical configuration and principle thereof, for example, a system is preferable, which is performed by using the basic principle disclosed in U.S. Pat. No. 4,723,129 or U.S. Pat. No. 4,740,796. This system can be applied to both the so-called on-demand type and continuous type, and especially in the case of the on-demand type, to an electrothermal converting element arranged corresponding to the sheet and liquid path in which the liquid (ink) is kept, at least one driving signal corresponding to the recording information to give a sudden temperature rising exceeding the nuclear boiling is applied, and consequently, thermal energy is generated in the electrothermal converting element, and film boiling is produced on the heat acting surface of the recording head, and as a result, it is possible to form a bubble in the liquid (ink) corresponding one-to-one to this driving signal, which is effective. By the growth and contraction of this bubble, the liquid (ink) is discharged through the discharging opening, and at least one droplet is formed. When making this driving signal have a pulse-shape, the growth and contraction of the bubble are performed instantly and properly, and therefore, the discharge of liquid (ink) excellent especially in responsibility can be attained, which is more preferable.

As this pulse-shaped driving signal, a signal is suitable, which is described in U.S. Pat. No. 4,463,359 or U.S. Pat. No. 4,345,262. Furthermore, when adopting the condition described in U.S. Pat. No. 4,313,124 of an invention relating to the temperature rising ratio of the above described heat acting surface, a more excellent recording can be performed.

As the configuration of a recording head, the configuration using U.S. Pat. No. 4,558,333 or U.S. Pat. No. 4,459,600 disclosing the configuration where the heat acting section is arranged in a bent area is also included in the present invention, besides the configuration (linear liquid flow path or right-angled liquid flow path) of the combination of the ejection orifice, liquid path, and electrothermal converting element that is disclosed in each of the above described specifications.

In addition to that, the present invention is also effective when adopting a configuration based on Japanese Patent Application Laid-Open No. 59-123670 that discloses a configuration where a common slit serves as the ejection orifice of the electrothermal converting element for a plurality of electrothermal converting elements, or Japanese Paten Laid-Open Publication No. 59-138461 that discloses a configuration where the opening hole for absorbing the pressure wave of thermal energy corresponds to the ejection orifice.

Furthermore, a full-line type recording head with a length corresponding to the width of the maximum recording medium that can be recorded by a recording apparatus can have any one of a configuration where the length thereof is fulfilled by the combination of a plurality of recording heads as disclosed in the above described specification and a configuration of one integrally formed recording head, and the present invention can exhibit the above described effect more effectively.

In addition to that, the present invention is effective even in the case of using an exchangeable chip type recording head in which the electrical connection with the apparatus main body and the supply of ink from the apparatus main body can be performed by being mounted on the apparatus main body, or a cartridge type recording head in which the ink tank is integrally provided to the recording head itself.

Furthermore, it is preferable to add recovery means, preliminary auxiliary means or the like for the recording head that is provided as a configuration of a recording apparatus of the present invention, since it can furthermore stabilize the effect of the present invention. When citing these particularly, there are capping means for the recording head, cleaning means, pressurizing or sucking means, pre-heating means by using an electrothermal converting element or another heating element or the combination thereof, and means of performing a preliminary discharge mode for performing a discharge other than that of recording, which are effective for performing a stable recording.

Furthermore, as a recording mode of the recording apparatus, not only a recording mode of the mainline color such as black only, but also a mode of integrally configuring a recording head or combining a plurality of pieces is possible, and the present invention is also extremely effective for an apparatus that has at least either the compound color of different colors or the full color by color mixture.

In the above described embodiment of the present invention, the description is given letting ink be liquid, but the ink is usually an ink that is solidified at a temperature less than the room temperature and is softened at the room temperature, or in the above described ink jet system, the ink is usually an ink in which the ink itself is thermally adjusted within the range of 30° C. or more and 70° C. or less to thermally control the viscosity of the ink so that it may be within the range of the stable discharge, and therefore, it is sufficient that the ink becomes liquid when giving a used recording signal.

In addition to that, it is also applicable to the present invention to use an ink with a property of being liquefied initially by thermal energy such as an ink that is liquefied by the giving of thermal energy according to a recording signal and that is discharged as a liquid ink, or an ink that starts to be solidified previously at the time of reaching a recording medium, in either the case where the temperature rising because of thermal energy is positively prevented by using that as the energy of changing the state from the solid state to the liquid state of an ink, or the case where an ink that is solidified in the state of being left alone is used for the purpose of preventing the ink from evaporating.

In such a case, it is also possible that the ink is in the form of facing to the electrothermal converting element in the state of being kept as a liquid or solid material in a porous sheet recess or a through hole, as described in Japanese Patent Application Laid-Open No. 54-56847 or Japanese Patent Application Laid-Open No. 60-71260. In the present invention, the most effective form for each of the above described inks is a form of performing the above described film boiling system.

Furthermore, in addition to that, as a form of a recording apparatus according to the present invention, it is also possible to adopt a form of a copying apparatus combined with a reader and further, a form of a facsimile apparatus with the transmitting and receiving function, besides a form of an apparatus that is provided integrally or separately as an image output terminal of information processing equipment such as a word processor or a computer.

Next, the outline of a liquid discharge apparatus on which the above described liquid ejection head is mounted will be described.

Figure 22:
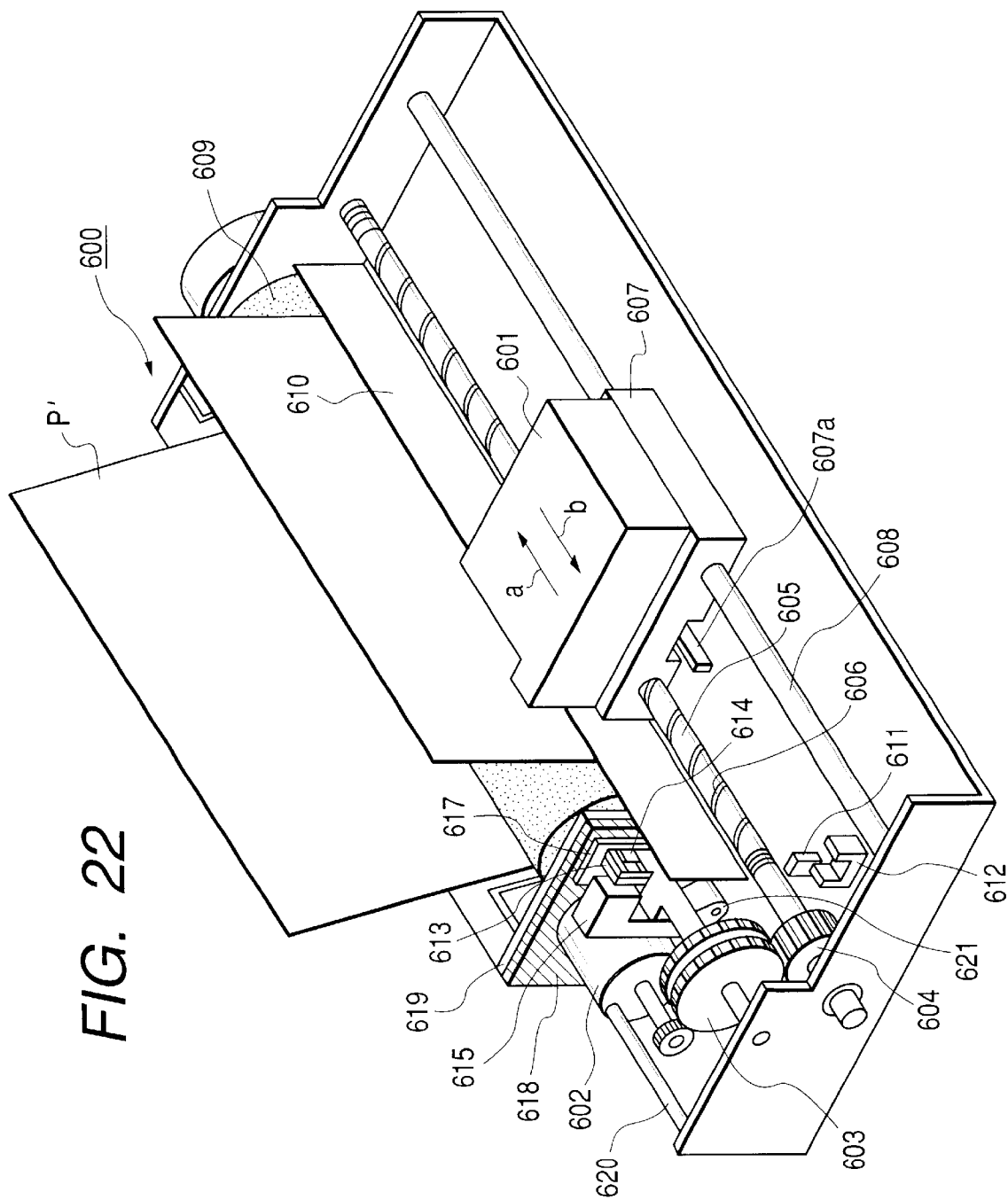
FIG. 22 is a configuration of an ink jet recording apparatus to which the present invention can be applied.

FIG. 22 is a schematic perspective of an ink jet recording apparatus 600 of one example of a liquid discharge apparatus to which a liquid ejection head of the present invention can be mounted and applied. In FIG. 22, an ink jet head cartridge 601 is a cartridge in which the above described liquid ejection head and an ink tank for keeping the ink to be supplied to this liquid ejection head are integrated. This ink jet head cartridge 601 is mounted on a carriage 607 engaged with a spiral groove 606 of a lead screw 605 rotating with the forward and reverse rotation of a driving motor 602 through driving force transmitting gears 603, 604, and it is reciprocated in the directions shown by arrows a, b along a guide 608 together with the carriage 607 by the power of the driving motor 602. A recording medium P is carried on a platen roller 609 by unillustrated recording medium feeding means, and it is pressed to the platen roller 609 through the moving direction of the carriage 607 by a paper presser plate 610.

Near one end of the lead screw 605, photo couplers 611, 612 are provided. These are home position detecting means for confirming the existence in this area of a lever 607a of the carriage 607 and for performing the switching of the rotational direction of the driving motor 602 or the like.

A support member 613 supports a cap member 614 covering the front surface (ejection orifice surface) having the ejection orifice of the above described ink jet head cartridge 601. Furthermore, ink sucking means 615 sucks the ink that is vacantly discharged from the ink jet head cartridge 601 and is accumulate in the cap member 614. The suction recovery of the ink jet head cartridge 601 is performed through the opening section (not shown in the figure) in the cap by this ink sucking means 615.

A cleaning blade 617 for wiping the ejection orifice surface of the ink jet head cartridge 601 is provided so that it may move in the forward and backward directions (directions at right angles to the traveling direction of the above described carriage 607) by a movable member 618. These cleaning blade 617 and movable member 618 are supported by a main body supporting body 619. The cleaning blade 617 is not limited to this form, but it may be another well known cleaning blade.

In the suction recovery operation of the liquid ejection head, a lever 620 for starting the suction is moved with the movement of a cam 621 engaged with the carriage 607, and the driving force from the driving motor 602 is moved and controlled by well known transmitting means such as the clutch shifting. An ink jet recording control section that gives a signal to a heat-generating body provided to the liquid ejection head of the ink jet head cartridge 601 and that governs the driving control of each of the above described mechanisms is provided on the apparatus main body side, and it is not illustrated here.

The ink jet recording apparatus 600 with the above described configuration performs recording onto a recording medium P that is carried on the platen roller 609 by the unillustrated recording medium feeding means while the ink jet head cartridge 601 reciprocates through the whole width of the recording medium P.

EXAMPLES

The present invention will be described below in detail by Examples. Unless defined specially, the composition of the ink means "part by weight."

Black Ink
Pigment dispersant 1

Carbon black of 10 g with a surface area of 230 m²/g and a DBP oil absorption of 70 ml/100 g, and p-amino-N-benzoic acid of 3.06 g were sufficiently mixed into water of 72 g, and after that, nitric acid of 1.62 g was dripped in this, and was stirred at 70° C. Several minutes after, a solution of 1.07 g sodium nitrite in 5 g water was added thereto, and stirred for one hour. Next, the obtained slurry was filtered by a filter (trade name: Toyo-Roshi No. 2; made by Advantis Ltd.), and the pigment particles were fully washed with water, and dried in an oven at 90° C. After that, water was added to thus obtained pigment, to prepare a pigment dispersion 1 of a pigment concentration of 10 wt %. By the above described method, an anionic group represented by the following chemical formula was introduced to the surface of carbon black.

[Che 21]

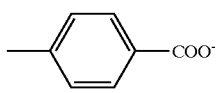

Subsequently, by using the pigment dispersant 1, the black ink 1 and the black ink 2 were prepared by the following method.

| (Black ink 1: Bk1) | |
|---|---|
| Pigment dispersant 1 | 30 parts |
| trimethylol propane | 6 parts |
| glycerol | 6 parts |
| diethylene glycol | 6 parts |
| acetylene glycol ethylene oxide adduct (commercial name, "Acetylenol EH"; made by Kawaken Fine Chemicals Corp). | 0.2 parts |
| Water | other parts |
| (Black ink 2: Bk2) | |
| Pigment dispersant 1 | 30 parts |
| trimethylol propane | 6 parts |
| glycerol | 6 parts |
| diethylene glycol | 6 parts |
| Acetylenol EH | 0.2 parts |
| Ammonium benzoate | 1 part |
| Water | other parts |

The following components were mixed, well-stirred and dissolved, then subjected to pressure filtration with a micro-filter of 0.2 μm in pore size (from Fuji Photo Film Co., Ltd.) to prepare the ink.

| (Yellow ink 1: Y1) | |
|---|---|
| Acetylenol EH | 1.0 part |
| Urea | 6 parts |
| 2-pyrrolidone | 6 parts |
| Ethanol | 5 parts |
| C. I. Direct Yellow 132 | 3 parts |
| Water | other parts |
| (Yellow ink 2: Y2) | |
| Acetylenol EH | 1.0 part |
| Ethylene urea | 6 parts |
| 2-pyrrolidone | 6 parts |
| Ethanol | 5 parts |
| C. I. Direct Yellow 132 | 3 parts |
| Magnesium nitrate salt | 1 part |
| Water | other parts |
| (Yellow ink 3: Y3) | |
| Acetylenol EH | 1.0 part |
| Ethylene urea | 6 parts |
| 2-pyrrolidone | 6 parts |
| Ethanol | 5 parts |
| C. I. Direct Yellow 132 | 3 parts |
| Magnesium nitrate salt | 2 parts |
| Water | other parts |
| (Magenta ink 1: M1) | |
| Acetylenol EH | 1.0 part |
| Urea | 6 parts |
| 2-pyrrolidone | 6 parts |
| Ethanol | 5 parts |
| Exemplified compound 7 | 3 parts |
| Exemplified compound 8 | 1 part |
| C. I. Acid Red 289 | 0.1 parts |
| Water | other parts |
| (Magenta ink 2: M2) | |
| Acetylenol EH | 1.0 part |
| Trimethylol propane | 6 parts |
| 2-pyrrolidone | 6 parts |
| Ethanol | 5 parts |
| Exemplified compound 7 | 3 parts |
| Exemplified compound 8 | 1 part |
| C. I. Acid Red 289 | 0.1 parts |
| Magnesium nitrate salt | 2 part |
| Water | other parts |

-continued (Magenta ink 3: M3)

| | |
|---|---|
| Acetylenol EH | 1.0 part |
| Ethylene urea | 6 parts |
| 2-pyrrolidone | 6 parts |
| Ethanol | 5 parts |
| Exemplified compound 7 | 3 parts |
| Exemplified compound 8 | 1 part |
| C. I. Acid Red 289 | 0.1 parts |
| Magnesium nitrate salt | 3 part |
| Water | other parts |

(Cyan ink 1: C1)

| | |
|---|---|
| Acetylenol EH | 1.0 part |
| Urea | 6 parts |
| 2-pyrrolidone | 6 parts |
| Ethanol | 5 parts |
| C. I. Direct Blue 199 | 3.5 parts |
| C. I. Acid Blue 9 | 0.3 part |
| Water | other part |

(Cyan ink 2: C2)

| | |
|---|---|
| Acetylenol EH | 1.0 part |
| Trimethylol propane | 6 parts |
| 2-pyrrolidone | 6 parts |
| Ethanol | 5 parts |
| C. I. Direct Blue 199 | 3.5 parts |
| C. I. Acid Blue 9 | 0.3 part |
| Magnesium nitrate salt | 2 part |
| Water | other parts |

(Cyan ink 3: C3)

| | |
|---|---|
| Acetylenol EH | 1.0 part |
| Ethylene urea | 6 parts |
| 2-pyrrolidone | 6 parts |
| Ethanol | 5 parts |
| C. I. Direct Blue 199 | 3.5 parts |
| C. I. Acid Blue 9 | 0.3 part |
| Magnesium nitrate salt | 3 part |
| Water | other parts |

(Cyan ink 4: C4)

| | |
|---|---|
| Acetylenol EH | 1.0 part |
| Ethylene urea | 6 parts |
| 2-pyrrolidone | 6 parts |
| Ethanol | 5 parts |
| C. I. Direct Blue 199 | 1.5 parts |
| Magnesium nitrate salt | 3 part |
| Water | other parts |

Absorbance

Absorbance of inks C3 and C4 at the maximum absorption wavelength in the visible light range was measured. As a result, the maximum absorption wavelength and absorbance of C3 were 621.5 nm and 1.10, respectively.

The maximum absorption wavelength and absorbance of C3 were 615.5 nm and 0.38, respectively. C3 and C4 have almost the same color tone. The absorbance ratio of C4 to C3 was $C4/V3 \approx 0.347 \geq 1/20$. Absorbance of C1 and C2 were almost equal to C3.

Preparation of Image Sample

Using the inks as described above, printing was conducted by employing an on-demand type ink jet printer, in which a heating element is used as an energy source for ink discharge, as an ink jet recording apparatus.

(1) Residual Rate of Reflection Density and ΔE

Solid color patches of reflection density of 1.0 were printed on glossy paper (PR-101; manufactured by Canon) with Y2, M2, C2 and C4 inks loaded on the printer respectively. The resultant prints were air-dried for 24 hours and subjected to a light fastness test by exposing them to light from a Xenon Fade Meter Ci 3000 (manufactured by Atlas) through a glass cover, at an illuminance of 63 klux for 100 hours.

The lamp, filter, temperature (25° C.) and humidity (55%) in the vessel were in accordance with the conditions of ISO10977 of the solar light through the window in the room. According to the ISO standard, illuminance is 6 klux, but a test of 6000 klux·hr or higher requires a long testing time, so that the test was carried out under 63 klux for 100 hours, confirming that no contradiction is present between the results of the same irradiation amounts. The reflection density and the color coordinate L*a*b* of the printed solid portion were measured before and after the test by using Spectrodensitometer X-rite 938 (trade name; manufactured by X-rite). The color difference ΔE before and after the test was determined from the L*a*b* after Equation (1), and the residual rate of reflection density was also calculated.

The result was shown in the following Table 1.

TABLE 1

| Ink | Y2 | M2 | C2 | C4 |
|---|---|---|---|---|
| Residual rate of reflection density | 96 | 91 | 92 | 92 |
| ΔE | 3 | 4 | 5 | 3 |

The ink sets each containing C2, M1, and Y1 color inks; C3, M3, and Y3 color inks, and C3, M1, and Y1 color inks were individually subjected to the same test as described above. As a result, in any ink set, the difference of ΔE values is smaller than 10, the residual rates of reflective density of all inks were 80% or more.

(2) Color Balance

Ink sets shown in Table 2 were prepared, and inks of each ink set were filled in ink containers of an ink jet recording apparatus to print a full color image on the glossy paper (PR-101, made by Canon Inc) with these inks.

TABLE 2

| Example | Bk | C | M | Y |
|---|---|---|---|---|
| 1 | Bk1 | C2 | M2 | Y2 |
| 2 | Bk1 | C2 | M1 | Y1 |
| 3 | Bk2 | C2 | M2 | Y2 |
| 4 | Bk2 | C2 | M1 | Y1 |
| 5 | Bk2 | C3 | M3 | Y3 |
| 6 | Bk2 | C3 | M1 | Y1 |

After air drying for 24 hours, the printed matter was subjected to the same light fastness test as described above. The color balance of the printed matter after the test was visually evaluated. The results are shown in Table 3.

(3) Bleeding Between Black Ink and Color Ink

Using each ink set, a pattern was printed in a manner that the solid image formed with the black ink abuts the solid image formed with of the color ink containing a polyvalent metal salt. Three ink jet recording apparatuses (commercial name: BJF-600, BJF-800, and BJF-850, made by Canon Inc) of which heads were modified to apply 30 ng of the black ink and 15 ng of color inks to an area of 1/600 square inches were used. In the BJF-850 of which nozzles for each color are arranged in parallel along a scanning direction of the recording head, the inks were arranged in the order of black, cyan, magenta, and yellow.

The recording medium used for the printing test was the normal paper of following two kinds: PB PAPER, a copying paper made by Canon Inc. and 4024 PAPER made by Xerox. The standard of evaluation was presented below. The result was shown in the following Table 3.

A: no bleeding is observed in all boundary regions;
B: very small bleeding is observed but ignorable; and
C: bleeding is observed.

TABLE 3

| Example | Color balance | Bleeding |
| --- | --- | --- |
| 1 | No problem | A |
| 2 | No problem | A |
| 3 | No problem | A |
| 4 | No problem | A |
| 5 | No problem | A |
| 6 | No problem | A |

(4) Fixability and Color Tone of the Black Image Formed with both Black Ink and Color Ink.

Five successive printing was carried out forming a black image by applying the color ink so as to overlap each other. After printing, sheets of recording medium were piled arranging four corners, and the printed images were observed about image irregularity and offset (ink attached to the back of other sheet). As the color ink, the cyan inks (C3 and C4) having the same color tone and a different concentration of the coloring material were used. BJF-850 (Canon) modified to apply black ink at 31 ng per 1/600 square inch and color ink at 4.5 ng per 1/600 square inch was used as the recording apparatus. Inks were arranged in the order of Bk2, C4, and C3. As the recording medium, PB PAPER, the copying paper made by Canon Inc. and 4024 PAPER made by Xerox and evaluation was conducted under ambient temperature and humidity.

As a result, when the color ink C3 or C4 was underprinted before the black ink, fixability was improved and irregularity of the image and offset were reduced in comparison with the case where the image was formed with the black ink only. On the other hand, in comparison with the image formed only by the Bk ink, the image formed with underprinting of C3 showed small change of the color tone, but the image formed with underprinting of C4 hardly showed change of the color tone.

As described above, the present invention can provide a high-quality multicolor image with good color development, less bleeding in the boundary between the black image and the color image, and less break of the color balance even after long preservation.

What is claimed is:

1. An ink set comprising a black ink containing an aqueous medium and a pigment dispersed in the aqueous medium by an action of an ionic group, and at least two color inks each containing a coloring material and an aqueous medium, wherein
   (i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and
   (ii) at least one of the color inks contains a polyvalent metal ion that destabilizes dispersion stability of the pigment in the black ink,
wherein the pigment of the black ink is carbon black having at least one anionic hydrophilic group directly bonded or indirectly bonded via another atomic group to the surface thereof as the ionic group.

2. The ink set according to claim 1, wherein each of the images formed with the respective color inks has a residual rate of reflection density of 70% or higher after the fading test.

3. The ink set according to claim 1, wherein each of the images formed with the respective color inks has a residual rate of reflection density of 80% or higher after the fading test.

4. The ink set according to claim 1, wherein in the fading test, light exposure is 6000 klux·hr or higher.

5. The ink set according to claim 1, wherein the condition in the fading test is following ISO10977.

6. The ink set according to claim 1, wherein the images are formed on a recording medium having a substrate and a porous particulate layer or a polymer layer on the substrate.

7. The ink set according to claim 1, wherein the ink set comprises a first color ink and a second color ink having the same color tone, and an absorbance of the first color ink at a maximum absorption wavelength in visible light region is higher than that of the second color ink at a maximum absorbance wavelength in visible light region.

8. The ink set according to claim 7, wherein an image formed on a recording medium with the second color ink is visually recognizable.

9. The ink set according to claim 7, wherein the absorbance of the second color ink is not lower than 1/20 of the absorbance of the first color ink.

10. The ink set according to claim 1, wherein the ink set comprises at least three color inks.

11. The ink set according to claim 10, wherein the ink set comprises at least a cyan ink, a magenta ink, and an yellow ink.

12. The ink set according to claim 11, wherein at least one color ink selected from the group consisting of cyan, magenta, and yellow inks comprises a first color ink and a second color ink having a same color tone and an absorbance of the first color ink at a maximum absorbance wavelength in visible light region is higher than an absorbance of the second color ink at a maximum absorbance wavelength in visible light region.

13. The ink set according to claim 12, wherein an image formed on a recording medium by the second color ink is visually recognizable.

14. The ink set according to claim 12, wherein the absorbance of the second color ink is not lower than 1/20 of the absorbance of the first color ink.

15. The ink set according to claim 1, wherein the ink set comprises a magenta ink as one of the color inks and the magenta ink contains at least one coloring material represented by the following formula (I) as a coloring material:

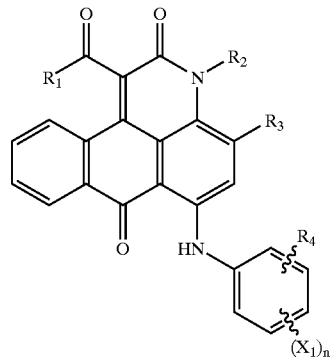

Formula (I)

wherein $R_1$ represents a substituted or unsubstituted alkoxy group or a substituted or unsubstituted aryl group; $R_2$ and $R_4$ independently represent a hydrogen atom or a substituted or unsubstituted alkyl group; and $R_3$ is selected from the group consisting of a hydrogen atom, a substituted or unsubstituted alkyl group, a substituted or unsubstituted alkoxy group, a substituted or unsubstituted aryloxy group, or a halogen atom; $X_1$ represents a carboxyl group or the salt thereof or a sulfonic acid group or the salt thereof; and n represents 1 or 2.

16. The ink set according to claim 15, wherein the magenta ink further contains at least one of:
   (i) a coloring material represented by the following formula (II),
   (ii) a coloring material represented by the following formula (III), and
   (iii) a coloring material having a xanthene structure:

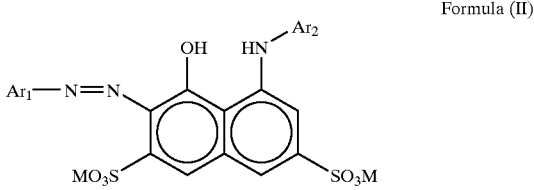

Formula (II)

wherein $Ar_1$ represents a substituted or unsubstituted phenyl group or a substituted or unsubstituted naphthyl group; $Ar_2$ is selected from the group consisting of an acetyl group, a benzoyl group, a 1,3,5-triazinyl group, a $SO_2$-$C_6H_5$ group, and $SO_2$-$C_6H_4$-$CH_3$ and M is a counterion of a sulfonic acid group selected from the group consisting of a hydrogen atom, an alkali metal, an ammonium, and an organic ammonium;

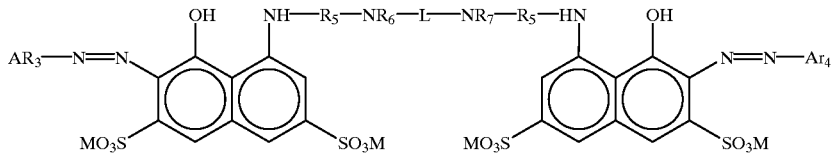

Formula (III)

wherein $Ar_3$ and $Ar_4$ represent independently a substituted or unsubstituted phenyl group or a substituted or unsubstituted naphthyl group and at least one of $Ar_3$ and $Ar_4$ has a substituent of a carboxyl group or the salt thereof or a sulfonic acid group or the salt thereof; M is a counterion of a sulfonic acid group selected from the group consisting of a hydrogen atom, an alkali metal, ammonium, and organic ammonium; $R_5$ represents a 1,3,5-triazinediyl group; $R_6$ and $R_7$ are independently selected from the group consisting of a hydrogen atom, a substituted or unsubstituted alkyl group, a substituted or unsubstituted alkenyl group, a substituted or unsubstituted aralkyl group, and an atomic group together with N atom forming a perhydroxyazine ring, and L represents a divalent organic linker.

17. The ink set according to claim 1, wherein the ink set comprises a cyan ink as one of the color inks and the cyan ink contains at least one coloring material having a copper phthalocyanine structure.

18. The ink set according to claim 17, wherein the cyan ink contains Direct Blue 199 as the coloring material.

19. The ink set according to claim 1, wherein the ink set comprises a yellow ink as one of the color inks and the yellow ink contains Direct Yellow 132 as the coloring material.

20. The ink set according to claim 11, wherein the magenta ink contains as the coloring material a coloring material represented by the formula (I) and at least one of:
   (i) a coloring material represented by the formula (II),
   (ii) a coloring material represented by the formula (III), and
   (iii) a coloring material having a xanthene structure;
      the cyan ink contains Direct Blue 199 as the coloring material, and
      the yellow ink contains Direct Yellow 132 as the coloring material.

21. The ink set according to claim 1, wherein the color ink contains a polyvalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

22. The ink set according to claim 1, wherein the polyvalent metal ion is derived from a polyvalent metal salt, and the polyvalent metal salt is contained in an amount of 0.1 to 15% by weight of the total weight of the color ink.

23. The ink set according to claim 22, wherein the polyvalent metal salt is contained in an amount of 2 to 5% by weight of the total weight of the color ink.

24. The ink set according to claim 1, wherein the color ink further contains at least one of 2-pyrrolidone and ethylene urea.

25. The ink set according to claim 24, wherein the color ink contains 2-pyrrolidone and ethylene urea.

26. The ink set according to claim 1, wherein the pigment in the black ink exists stably in a pH range from 3 to 7 and the color ink containing the polyvalent metal ion to make the dispersion stability of the pigment in the black ink unstable has a pH from 8 to 11.

27. The ink set according to claim 1, wherein the pigment in the black ink exists stably in a pH range from 7 to 11 and the color ink containing the polyvalent metal ion to make the dispersion stability of the pigment in the black ink unstable has a pH from 3 to 6.

28. The ink set according to claim 1, wherein the black ink has a Ka value according to the Bristow method of 0.2 mL·m$^{-2}$·msec$^{-\frac{1}{2}}$ and more and lower than 1.5 mL·m$^{-2}$·msec$^{-\frac{1}{2}}$ and each of the respective color inks has a Ka value of 5 mL·m$^{-2}$·msec$^{-\frac{1}{2}}$ or higher and lower than 10 mL·m$^{-2}$/msec$^{-\frac{1}{2}}$ according to the Bristow method.

29. The ink set according to claim 1, wherein the black ink further contains a salt.

30. The ink set according to claim 29, wherein the black ink contains the pigment at a concentration for forming an image having an optical density, and the concentration is such that the optical density of the image cannot be obtained when no salt is contained in the ink.

31. The ink set according to claim 29, wherein the salt contained in the black ink is at least one selected from the group consisting of $(M1)_2SO_4$, $CH_3COO(M1)$, Ph-COO(M1), $(M1)NO_3$, $(M1)Cl$, $(M1)Br$, $(M1)I$, $(M1)_2SO_3$, and $(M1)_2CO_3$, where M1 is an alkali metal, ammonium, or an organic ammonium.

32. The ink set according to claim 1, wherein the black ink and the color ink are used for ink jet recording.

33. An ink jet recording method comprising the steps of:
   preparing a black ink containing an aqueous medium and a pigment dispersed in the aqueous medium by an action of an ionic group;

preparing at least two or more color inks each containing a coloring material and an aqueous medium; and attaching each of the black ink and the two or more color inks to a recording medium by discharging from orifices according to a recording signal, wherein
(i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and
(ii) at least one of the color ink contains a polyvalent metal ion that destabilizes dispersion stability of the pigment in the black ink, and wherein the pigment of the black ink is carbon black having at least one anionic hydrophilic group directly bonded or indirectly bonded via another atomic group to the surface thereof as the ionic group.

34. The ink jet recording method according to claim 33, wherein the ink is discharged by thermal energy.

35. The ink jet recording method according to claim 33, wherein the black ink and the color ink containing a polyvalent metal ion to destabilize dispersion stability of the pigment in the black ink are both discharged so as to contact each other on the recording medium.

36. A recording unit comprising a black ink container containing a black ink;

color ink containers containing each of at least two color inks; and a head part to discharge the respective inks, wherein the black ink and the color inks are those constituting an ink set according to claim 32.

37. The recording unit according to claim 36, wherein the head part comprises a head that discharges the respective inks by applying thermal energy to the inks.

38. An ink cartridge comprising a black ink container containing a black ink;

color ink containers containing each of at least two color inks; wherein the black ink and color inks are those constituting an ink set according to claim 1.

39. An ink jet recording apparatus comprising ink containers containing respective inks constituting an ink set according to claim 32 and a head part to discharge the respective inks.

40. The ink jet recording apparatus according to claim 39, wherein the head part contains heads to discharge the respective inks by applying thermal energy to the inks.

41. An ink set of color inks to be used together with a black ink containing an aqueous medium and a pigment dispersed in the aqueous medium by an action of an ionic group, wherein the ink set comprises at least two color inks each containing a coloring material and an aqueous medium; and wherein
(i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and
(ii) at least one of the color inks contains a polyvalent metal ion that destabilizes dispersion stability of the pigment in the black ink, wherein the pigment of the black ink is carbon black having at least one anionic hydrophilic group directly bonded or indirectly bonded via another atomic group to the surface thereof as the ionic group.

42. An ink set comprising at least two color inks each containing a coloring material and an aqueous medium, wherein
(i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and
(ii) at least one of the color inks contains a polyvalent metal ion that destabilizes dispersion stability of the pigment in the black ink, wherein the pigment of the black ink is carbon black having at least one anionic hydrophilic group directly bonded or indirectly bonded via another atomic group to the surface thereof as the ionic group.

43. A bleed-alleviating method of a multi-color image formed by applying a black ink containing an aqueous medium and a pigment dispersed in the aqueous medium by an action of an ionic group and a first to n th color inks each containing a coloring material and an aqueous medium to a recording medium by an ink jet system, respectively, wherein
(i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and
(ii) at least the first color ink contains a polyvalent metal ion to destabilize dispersion stability of the pigment in the black ink; wherein the pigment of the black ink is carbon black having at least one anionic hydrophilic group directly bonded or indirectly bonded via another atomic group to the surface thereof as the ionic group, and the first color ink and the black ink are applied so as to contact with each other on a recording medium, where n is an integer of 2 or larger.

44. A method for improving fixability of a black image in a multicolor image, the multicolor image being formed by applying a black ink containing an aqueous medium and a pigment dispersed in the aqueous medium by an action of an ionic group, and a first to n th color inks each containing a coloring material and an aqueous medium to a recording medium by an ink jet system, wherein
(i) respective images formed with the respective color inks have the same ΔE or have the difference in ΔE that is 10 or less in a CIELAB color space display system in a fading test under conditions that cause fading corresponding to pseudo-indoor sunlight fading through a window for 3 years or more, and
(ii) at least the first color ink contains a polyvalent metal ion to destabilize dispersion stability of the pigment in the black ink; wherein the pigment of the black ink is carbon black having at least one anionic hydrophilic group directly bonded or indirectly bonded via another atomic group to the surface thereof as the ionic groups, and the first color ink and the black ink are applied so as to overlap each other on the recording medium in a region where the black image is to be formed, where n is an integer of 2 or larger.

* * * * *

UNITED STATES PATENT AND TRADEMARK OFFICE
CERTIFICATE OF CORRECTION

PATENT NO. : 6,706,104 B2
DATED : March 16, 2004
INVENTOR(S) : Hiroyuki Takuhara et al.

It is certified that error appears in the above-identified patent and that said Letters Patent is hereby corrected as shown below:

Column 1,
Line 39, "fading conspicuous." should read -- concpicuous fading: --.
Line 46, "impressin" should read -- impression --.
Line 60, "is" should read -- are --. 1$^{st}$ occurrence.

Column 2,
Line 14, "alleviate" should read -- alleviate bleeding --.
Line 51, "but" should read -- wherein --.
Line 54, "achievemetn" should read -- achievement --.
Lines 66-67 should be deleted.

Column 3,
Lines 1-2 should be deleted.
Line 6, "method." should read -- method for improving fixability. --.
Line 19, "perspective of" should read -- perspective view of --.
Line 35, "a" should be deleted.
Line 36, "view" should read -- views --.
Line 53, "space such" should read -- space display system such --.
Line 54, "space, a" should read -- space display system, a --.

Column 4,
Line 56, "adsorbed" should read -- which adsorb --.

Column 5,
Line 4, "polyvinyl" should read -- poly(vinyl --.
Line 8, "hydroxyproylmethyl" shold read -- hydroxyproplmethyl --.
Line 24, "silica is" should read -- silicas are --.

Column 6,
Line 18, "and thus" should read -- and is thus --.
Line 34, "black carbon," should read -- carbon black, --.

Column 7,
Line 1, "Valcan" should read -- Vulcan --.
Line 39, "destabilize" should read -- destabilizes --.

Column 9,
Line 34, "contact" should read -- contacts --.
Line 55, "ink break" should read -- ink to break --.

UNITED STATES PATENT AND TRADEMARK OFFICE
CERTIFICATE OF CORRECTION

PATENT NO. : 6,706,104 B2
DATED : March 16, 2004
INVENTOR(S) : Hiroyuki Takuhara et al.

It is certified that error appears in the above-identified patent and that said Letters Patent is hereby corrected as shown below:

Column 9 (cont'd),
Line 60, "contact" should read -- contacts --.
Line 63, "ink break" should read -- ink to break --.

Column 10,
Line 4, "y$^{3+}$," should read -- Y$^{3+}$, --.
Lines 5, 18 and 25, "contact" should read -- contacts --.
Line 7, "ink break" should read -- ink to break --

Column 11,
Line 8, "atom." should read -- atom, --.
Line 10, "thereof." should read -- thereof, and -- and "2)." should read -- 2. --.
Line 31, "Na)" should read -- Na -- and "(N(R$_8$)$_4$))," should read -- (N(R$_8$)$_4$), --.
Line 32, "ethyl" should read -- ethyl). --

Column 13,
Line 47, "materials" should read -- material --.

Colunm 14,
Line 2, "(N(R$_9$)$_4$)).," should read -- (N(R$_9$)$_4$), --.
Line 14, "groups," should read -- group, --.
Line 32, "includes," should read -- include, --.
Line 42, "(N(R$_{10}$)$_4$))," should read -- (N(R$_{10}$)$_4$), --.

Column 20,
Lines 27 and 35, "an" should read -- a --.
Line 49, "a case," should read -- such case --.

Column 21,
Line 58, "ethyl." should read -- ethyl). --.

Column 25,
Line 1, "C. I Direct Black" should read -- C. I. Direct Black --.
Line 2, "C. I Food Blacks" should read -- C. I. Food Blacks --.
Line 6, "those can" should read -- those which can --.
Line 9, "image's the" should read -- image has a --.
Line 11, "psuedo-indoor" should read -- pseudo-indoor --.
Line 15, "is" should read -- has --.
Line 19, "the (first occurrence) should be deleted.
Line 35, "C. I Food Black" should read -- C. I. Food Black --.

UNITED STATES PATENT AND TRADEMARK OFFICE
CERTIFICATE OF CORRECTION

PATENT NO. : 6,706,104 B2
DATED : March 16, 2004
INVENTOR(S) : Hiroyuki Takuhara et al.

It is certified that error appears in the above-identified patent and that said Letters Patent is hereby corrected as shown below:

Column 25 (cont'd),
Line 48, "1/20or" should read -- 1/20 or --
Line 49, "masimum" should read -- maximum --.
Line 54, "mount" should read -- amount --.

Column 26,
Line 38, "destabilize" should read -- destabilizes --.
Line 59, "exceeds" should read -- exceed --.

Column 27,
Line 8, "penetrating" should read -- penetrative --.

Column 28,
Line 18, "arrnaged." should read -- arranged. --.
Line 20, "amultinozzle" should read -- a multinozzle --.
Line 44, "denotes" should read -- denote --.
Line 47, "a" should read -- an --.
Line 48, "an" should read -- a --.

Column 29,
Line 30, "to integrated" should read -- to an intergrated --.

Column 30,
Line 67, "cyanogen," should read -- cyan, --.

Column 31,
Line 41, "Aliner)" should read -- Aligner) --.

Column 32,
Line 3, "intervals" should read -- interval --.
Line 11, "53 ω," should read -- 53 Ω, --.
Line 65, "2 ps" should read -- 2 μs --.

Column 33,
Line 30, "FM" should read -- $F_M$ --.

Column 35,
Line 34, "Paten" should read -- Patent --.

Column 37,
Line 9, "is accumulate" should read -- accumulates --.

UNITED STATES PATENT AND TRADEMARK OFFICE
CERTIFICATE OF CORRECTION

PATENT NO. : 6,706,104 B2
DATED : March 16, 2004
INVENTOR(S) : Hiroyuki Takuhara et al.

It is certified that error appears in the above-identified patent and that said Letters Patent is hereby corrected as shown below:

Column 38,
Line 65, "2 part" should read -- 2 parts --.

Column 39,
Lines 11, 34 and 41, "3 part" should read -- 3 parts --.
Line 19, "other part" should read -- other parts --.
Line 26, "2 part" should read -- 2 parts --.
Line 50, "C3" should read -- C4 --.
Line 52, "C4/V3" should read -- C4/C3 --.

Column 40,
Line 24, "inks," should read -- inks; --.
Line 33, "Inc)" should read -- Inc.) --.
Line 53, "name:" should read -- names: -- and "Inc)" should read -- Inc.) --.
Lines 63 and 64, "was" should read -- is --.

Column 41,
Line 13, "printing was" should read -- printings were --.
Line 26, "Xerox and" should read -- Xerox were used and --.

Column 42,
Line 23, "an" should read -- a --.

Column 45,
Line 12, "ink" should read -- inks --.
Line 37, "ink;" should read -- ink; and --.

Signed and Sealed this

Third Day of August, 2004

JON W. DUDAS
*Acting Director of the United States Patent and Trademark Office*